United States Patent
Goto et al.

(10) Patent No.: US 10,415,665 B2
(45) Date of Patent: Sep. 17, 2019

(54) FLUID-FILLED VIBRATION-DAMPING DEVICE

(71) Applicant: SUMITOMO RIKO COMPANY LIMITED, Komaki-shi, Aichi (JP)

(72) Inventors: Atsushi Goto, Komaki (JP); Tetsuji Ando, Komaki (JP); Mutsumi Muraoka, Komaki (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 16 days.

(21) Appl. No.: 15/135,621

(22) Filed: Apr. 22, 2016

(65) Prior Publication Data

US 2016/0238102 A1   Aug. 18, 2016

Related U.S. Application Data

(63) Continuation of application No. PCT/JP2015/074646, filed on Aug. 31, 2015.

(30) Foreign Application Priority Data

Dec. 8, 2014   (JP) ................. 2014-247734

(51) Int. Cl.
  *F16F 13/10*   (2006.01)
  *F16F 13/08*   (2006.01)
  *B60K 5/12*   (2006.01)
(52) U.S. Cl.
  CPC ............ *F16F 13/08* (2013.01); *B60K 5/1208* (2013.01); *F16F 13/103* (2013.01)
(58) Field of Classification Search
  CPC ...... F16F 13/103; F16F 13/105; F16F 13/106; F16F 1/387; F16F 15/085; B60K 5/1208
  (Continued)

(56) References Cited

U.S. PATENT DOCUMENTS 4,688,776 A * 8/1987 Lecour ................ E02B 17/0845
                                                       267/140
5,628,498 A * 5/1997 Nanno .................... F16F 13/10
                                                       267/140.13
(Continued)

FOREIGN PATENT DOCUMENTS

CN         2308763 Y    2/1999
DE   102011006156 A1 *  9/2012   ............ F16F 13/105
(Continued)

OTHER PUBLICATIONS

Takano, Kazuya et al. JP 02217640 A. Partial translation. (Year: 1990).*

(Continued)

*Primary Examiner* — Bradley T King
*Assistant Examiner* — Stephen M Bowes
(74) *Attorney, Agent, or Firm* — Oliff PLC

(57) ABSTRACT

A fluid-filled vibration-damping device including first and second mounting members elastically connected by a main rubber elastic body and a fluid chamber whose wall is partially constituted by the main rubber elastic body. A sealing member attached to the second mounting member has a step part, and an attaching tube part and a sealing tube part on opposite sides of the step part. A press-fit projection is formed peripherally partially on at least one of an inner peripheral face of the attaching tube part and an outer peripheral face of the second mounting member, so as to secure press-fit the second mounting member inserted into the attaching tube part. A transmission prevention part is provided in the step part on a portion that transmits press-fit stress from the attaching tube part to the sealing tube part so as to reduce stress transmission.

13 Claims, 19 Drawing Sheets

(58) Field of Classification Search
USPC .................................................. 267/140.13
See application file for complete search history.

(56) References Cited

U.S. PATENT DOCUMENTS

| | | | | |
|---|---|---|---|---|
| 6,863,269 B2* | 3/2005 | Okumura | .............. | F16F 13/085 |
| | | | | 267/140.13 |
| 2010/0109428 A1* | 5/2010 | Yamashita | .............. | B60T 13/57 |
| | | | | 303/31 |

FOREIGN PATENT DOCUMENTS

| | | | |
|---|---|---|---|
| EP | 2381127 A1 | | 10/2011 |
| JP | S58-37337 A | | 3/1983 |
| JP | 02217640 A | * | 8/1990 |
| JP | 4113889 B2 | | 7/2008 |
| JP | 2013-117258 A | | 6/2013 |
| WO | 2012/085766 A1 | | 6/2012 |

OTHER PUBLICATIONS

Nov. 2, 2015 Search Report issued in International Patent Application No. PCT/JP2015/074646.

English translation of Jun. 22, 2017 International Preliminary Report on Patentability issued in International Application No. PCT/JP2015/074646.

Jun. 5, 2019 Office Action issued in Chinese Patent Application No. 201580045565.4.

* cited by examiner

FLUID-FILLED VIBRATION-DAMPING DEVICE

INCORPORATED BY REFERENCE

The disclosure of Japanese Patent Application No. 2014-247734 filed on Dec. 8, 2014 including the specification, drawings and abstract is incorporated herein by reference in its entirety. This is a Continuation of International Application No. PCT/JP2015/074646 filed on Aug. 31, 2015.

BACKGROUND OF THE INVENTION

1. Field of the Invention

The present invention relates to a fluid-filled vibration-damping device used for an automobile engine mount or the like.

2. Description of the Related Art

From the past, a fluid-filled vibration-damping device has been known as one type of vibration damping support unit or vibration damping coupling unit which is interposed between members constituting a vibration transmission system to provide mutual vibration damping connection of those members. As shown in Japanese Patent No. JP-B-4113889, for example, the fluid-filled vibration-damping device has a constitution for which a first mounting member and a second mounting member are elastically coupled by a main rubber elastic body, and a fluid chamber inside of which non-compressible fluid is sealed is formed.

However, with the fluid-filled vibration-damping device of JP-B-4113889, a bearing cover is attached as a sealing member to the second mounting member and a bellows in the form of a bulkhead or flexible film is supported by the sealing member. Also, with JP-B-4113889, the attachment part of the bearing cover to the second mounting member has a stepped tube form, and by a hook shaped member provided on the large diameter top part being hooked and engaged on the outer peripheral edge of the second mounting member, the bearing cover is attached to the second mounting member.

However, with the constitution of JP-B-4113889, when the hook shaped member projecting to the inner periphery gets over the outer peripheral edge of the second mounting member, there is a large amount of deformation of the bearing cover, and there was the risk of problems such as an adverse effect on fluid tightness, damage to the bearing cover, or the like.

SUMMARY OF THE INVENTION

The present invention has been developed in view of the above-described matters as the background, and it is an object of the present invention to provide a fluid-filled vibration-damping device with a novel structure which is able to advantageously obtain sealing properties of the fluid chamber with a simple assembly.

The above and/or optional objects of this invention may be attained according to at least one of the following modes of the invention. The following modes and/or elements employed in each mode of the invention may be adopted at any possible optional combinations.

First, by performing investigation, trial production and the like for using a constitution of assembling the second mounting member and the sealing member using press-fitting, the inventors confirmed that the possibilities of problems occurring such as deformation of the sealing member during press-fitting causing a decrease in fluid tightness or the like. In light of that, to reduce the effect on fluid tightness by deformation of the sealing member that occurs during press-fitting, trial production and examination were repeated to achieve the present invention.

Specifically, a first mode of the present invention provides a fluid-filled vibration-damping device comprising: a first mounting member; an annular second mounting member; a main rubber elastic body that connects the first mounting member and the second mounting member elastically; a fluid chamber whose wall is partially constituted by the main rubber elastic body with a non-compressible fluid sealed therein; a tubular sealing member having a step part and being attached to the second mounting member, the sealing member having an attaching tube part and a sealing tube part on opposite sides of the step part; at least one press-fit projection formed partially on a periphery of at least one of an inner peripheral face of the attaching tube part and an outer peripheral face of the second mounting member, the second mounting member being inserted into the attaching tube part and secured press-fit by a formation part of the press-fit projection; and a transmission prevention part provided in the step part of the sealing member on a portion through which stress caused by press-fitting is transmitted from the attaching tube part to the sealing tube part so as to reduce stress transmission.

With this kind of fluid-filled vibration-damping device constituted according to the first mode, the press-fitting surface with the second mounting member and the attaching tube part of the sealing member is set partially on the periphery with press-fit projections, so the stress that accompanies press-fitting of the second mounting member mainly acts on the parts at which the press-fit projections are formed with the attaching tube part. Furthermore, transmission prevention parts that reduce stress transmission are formed on the step part of the sealing member, and the transmission prevention parts are arranged on the parts for which stress that accompanies press-fitting is transmitted from the attaching tube part to the sealing tube part. By so doing, the stress that acts on the attaching tube part accompanying press-fitting of the second mounting member has its transmission to the sealing tube part reduced by the transmission prevention parts, so deformation of the sealing tube part due to stress transmission is reduced, and it is possible to stably and effectively obtain the target sealing performance or the like.

A second mode of the present invention provides the fluid-filled vibration-damping device according to the first mode, wherein the at least one press-fit projection comprises a plurality of press-fit projections formed on the periphery of the second mounting member and the attaching tube part.

With the second mode, by the press-fit projections being formed at a plurality of locations on the periphery, press-fitting surfaces of the second mounting member and the attaching tube part are provided at the plurality of locations on the periphery, and it is easy to suitably adjust the resistance force in relation to the seal reaction force exhibited with press-fitting, stress due to press-fitting that acts on the attaching tube part, and the like. It is preferable for the plurality of press-fit projections to be arranged dispersed along the entire periphery, and by so doing, it is difficult for slant or the like to occur during press-fitting of the second mounting member to the attaching tube part, and it is possible to obtain stable sealing performance along the entire periphery after press-fitting. More preferably, the transmission prevention parts at the step part are also provided at a plurality of locations on the periphery of the step part at positions corresponding to the press-fit projections provided at the plurality of locations on the periphery.

A third mode of the present invention provides the fluid-filled vibration-damping device according to the first or second mode, wherein the press-fit projection protrudes on the inner peripheral face of the attaching tube part in the sealing member.

With the third mode, by having both the press-fit projections and the transmission prevention parts provided at the sealing member side, it is not necessary to position the second mounting member and the attaching tube part of the sealing member relative to each other in the peripheral direction during press-fitting, in order to arrange the transmission prevention parts on the part for which stress is transmitted from the part at which the press-fit projections are formed with the attaching tube part to the sealing tube part.

A fourth mode of the present invention provides the fluid-filled vibration-damping device according to any one of the first to third modes, wherein, with respect to the second mounting member and the attaching tube part, both a projecting tip of the press-fit projection and a contact face to which the projecting tip of the press-fit projection is abutted extend in an axial direction without slanting.

With the fourth mode, the second mounting member is press-fitted smoothly to the attaching tube part, and resistance force of the second mounting member to falling out from the attaching tube part is effectively exhibited, making it possible to obtain the target sealing performance. This mode includes not only cases when the projection tip end of the press-fit projection and the surface that abuts to the projection tip end of the press-fit projection are strictly not slanting in the axial direction, but also cases of substantially not slanting, such as cases when there is a slight slant at the level of being an extraction taper provided to make it easy to remove the metal mold during molding or the like.

A fifth mode of the present invention provides the fluid-filled vibration-damping device according to any one of the first to fourth modes, wherein the press-fit projection extends continuously with a prescribed length in a peripheral direction, and a projecting tip of the press-fit projection expands in the peripheral direction.

With the fifth mode, the second mounting member is press-fitted to the attaching tube part having a designated width in the peripheral direction at each part at which the press-fit projection is formed, so resistance force is advantageously exhibited in relation to seal reaction force due to press-fitting of the second mounting member and the attaching tube part.

A sixth mode of the present invention provides the fluid-filled vibration-damping device according to any one of the first to fifth modes, wherein the press-fit projection extends in an axial direction to a proximal end of the attaching tube part.

With the sixth mode, since the second mounting member and the attaching tube part are press-fitted along a broad range in the axial direction at the parts where the press-fit projections are formed, a large press-fitting surface area is ensured and resistance force to the seal reaction force due to press-fitting is advantageously exhibited, and relative inclining of the second mounting member and the attaching tube part during press-fitting is also avoided.

Also, in the case of providing the press-fit projections at the sealing member side, when the press-fit projections are formed so as to extend in the axial direction up to the proximal end of the attaching tube part, the press-fit projections function as ribs, the deformation rigidity of the attaching tube part and the step part becomes greater, and it is easier for the stress accompanying press-fitting to be transmitted from the attaching tube part to the sealing tube part. In light of that, with the present invention, by forming the transmission prevention parts at the step part, transmission of stress from the attaching tube part to the sealing tube part is reduced, so while realizing ensuring of resistance force against the seal reaction force by obtaining a large press-fit part in the axial direction, avoidance of inclination during press-fitting and the like, it is also possible to prevent a decrease in sealing performance due to transmission of stress to the sealing tube part and the like.

A seventh mode of the present invention provides the fluid-filled vibration-damping device according to any one of the first to sixth modes, wherein a peripheral length of the transmission prevention part is not less than a peripheral length of the press-fit projection, and the press-fit projection is arranged in an intermediate portion in a peripheral direction of the transmission prevention part.

With the seventh mode, the stress that acts on the attaching tube part during press-fitting of the second mounting member is based on the pushing and expanding force to the outer peripheral side in relation to the part on which the press-fit projections are arranged on the periphery of the attaching tube part, so by arranging the transmission prevention parts at the positions on the periphery corresponding with the press-fitting surface set by the press-fit projections, it is possible to effectively reduce the transmission of stress to the sealing tube part. In fact, by having the peripheral length of the transmission prevention part be not less than the peripheral length of the press-fit projection, and positioning the press-fit projections in the middle of the peripheral direction of the transmission prevention parts, the transmission of stress at the parts from which the transmission prevention parts are separated in the peripheral direction is decreased, and it is possible to more advantageously prevent deformation of the sealing tube part.

An eighth mode of the present invention provides the fluid-filled vibration-damping device according to any one of the first to seventh modes, wherein the transmission prevention part is a transmission prevention hole penetrating through the step part.

With the eighth mode, by the transmission prevention parts being holes that pierce through the step part, the transmission of stress is more effectively reduced, and compared to a case of the transmission prevention parts being constituted by slits or the like whose inner peripheral faces are in contact or close to each other, it is easier to avoid easy transmission of stress by the inner peripheral faces of the transmission prevention parts getting in mutual contact during deformation of the step part.

A ninth mode of the present invention provides the fluid-filled vibration-damping device according to any one of the first to eighth modes, wherein the transmission prevention part is provided at a portion of the step part including an extension line of the inner peripheral face of the attaching tube part.

With the ninth mode, the transmission of stress from the attaching tube part to the step part is efficiently reduced by the transmission prevention parts provided at the boundary part between the attaching tube part and the step part. In fact, by providing the transmission prevention parts constituted by a thin wall, hole or the like at the connection parts of the attaching tube part and the step part, the deformation rigidity of the attaching tube part and the step part is effectively reduced, and the stress that acts on the attaching tube part by press-fitting of the second mounting member is also reduced.

A tenth mode of the present invention provides the fluid-filled vibration-damping device according to any one of the first to ninth modes, wherein a reinforcing rib is provided at a portion of the step part away from the transmission prevention part so as to enhance deformation rigidity of the step part.

With the tenth mode, by reinforcing ribs that reinforce the step part being provided, even in a case when the transmission prevention parts are formed in a broad range on the periphery of the step part, it is possible to prevent the deformation rigidity of the step part from becoming smaller than necessary. In particular, by the reinforcing ribs being provided at sites away from the transmission prevention parts, it is possible to avoid the reinforcing ribs having an adverse effect on the stress transmission reduction effect by the transmission prevention parts.

An eleventh mode of the present invention provides the fluid-filled vibration-damping device according to any one of the first to tenth modes, further comprising: a sealing rubber compressed by the second mounting member being press-fitted into the attaching tube part of the sealing member to seal the fluid chamber temporarily; and a connecting member installed to the second mounting member to exert a pressing force in a press-fit direction between the second mounting member and the sealing member so as to enhance a compression ratio of the sealing rubber to seal the fluid chamber fully.

With the eleventh mode, in a temporarily sealed state by press-fitting of the second mounting member to the attaching tube part, it is sufficient if resistance force in relation to the seal reaction force of the sealing rubber can be ensured, and such a large resistance force that can prevent falling out of the second mounting member from the attaching tube part during vibration input is not necessary. Because of that, it is possible to make the stress that acts on the attaching tube part by press-fitting of the second mounting member relatively small, thereby making it possible to effectively prevent transmission of stress to the sealing tube part.

A twelfth mode of the present invention provides the fluid-filled vibration-damping device according to any one of the first to eleventh modes, wherein the fluid chamber comprises a pressure-receiving chamber whose wall is partially constituted by the main rubber elastic body and an equilibrium chamber whose wall is partially constituted by a flexible film, the pressure-receiving chamber and the equilibrium chamber are arranged on opposite axial sides of a partition member which is supported by the second mounting member, while the partition member is arranged on an inner peripheral side of the sealing tube part of the sealing member so that an outer peripheral face of the partition member is superposed to an inner peripheral face of the sealing tube part, and a sealing rubber is arranged between the second mounting member and the partition member, and the sealing rubber is compressed between the second mounting member and the partition member by the second mounting member being press-fitted into the attaching tube part to seal the fluid chamber in a fluid-tight manner.

With the twelfth mode, transmission of stress that accompanies press-fitting of the second mounting member to the sealing tube part is reduced, and it is possible to prevent the sealing tube part from deforming so as to expand to the outer peripheral side. Accordingly, it is possible to prevent formation of gaps between the inner peripheral face of the sealing tube part and the outer peripheral face of the partition member. Because of that, the problem of the sealing rubber that is to be compressed between the second mounting member and the partition member entering between the sealing tube part and the partition member etc. is avoided, thereby stably obtaining the target sealing performance.

A thirteenth mode of the present invention provides the fluid-filled vibration-damping device according to any one of the first to twelfth modes, further comprising a positioner that positions the second mounting member and the attaching tube part of the sealing member in relation to each other in a peripheral direction.

With the thirteenth mode, for example, even in cases when assembly with a specific relative orientation in the peripheral direction is required for the second mounting member and the sealing member, due to a structure for coupling with the vibration damping subject member, a difference in the spring characteristics on the periphery, the arrangement in the peripheral direction of the press-fit projections or transmission prevention parts or the like, this can be handled easily.

With the present invention, press-fit projections are formed partially on the periphery of at least one of the outer peripheral face of the second mounting member and the inner peripheral face of the attaching tube part of the sealing member, and press-fitting of the second mounting member is done into the attaching tube part at the part at which the press-fit projections are formed. Meanwhile, at the step part of the sealing member, the transmission prevention parts that reduce stress transmission are formed on the parts for which the stress due to press-fitting of the second mounting member is transmitted. Because of that, the stress applied to the attaching tube part by press-fitting of the second mounting member can be prevented from being transmitted to the sealing tube part via the step part of the sealing member, so that a decrease in sealing performance due to deformation of the sealing tube part or the like is avoided.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 19A shows the temporarily sealed state, and FIG. 19B shows the fully sealed state;

DETAILED DESCRIPTION OF PREFERRED EMBODIMENTS

Figure 1:
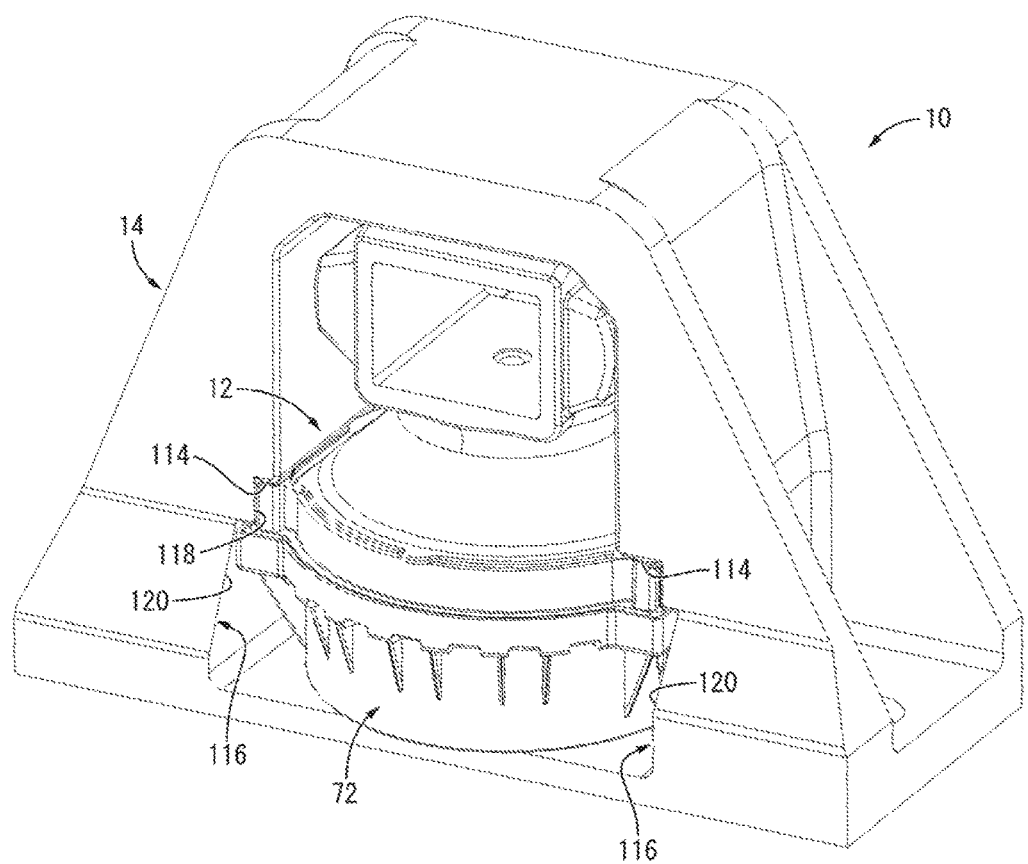
FIG. 1 is a perspective view showing a fluid-filled vibration-damping device in the form of an engine mount as a first embodiment of the present invention.

Following, we will describe embodiments of the present invention while referring to the drawings.

Figures 2, 3:
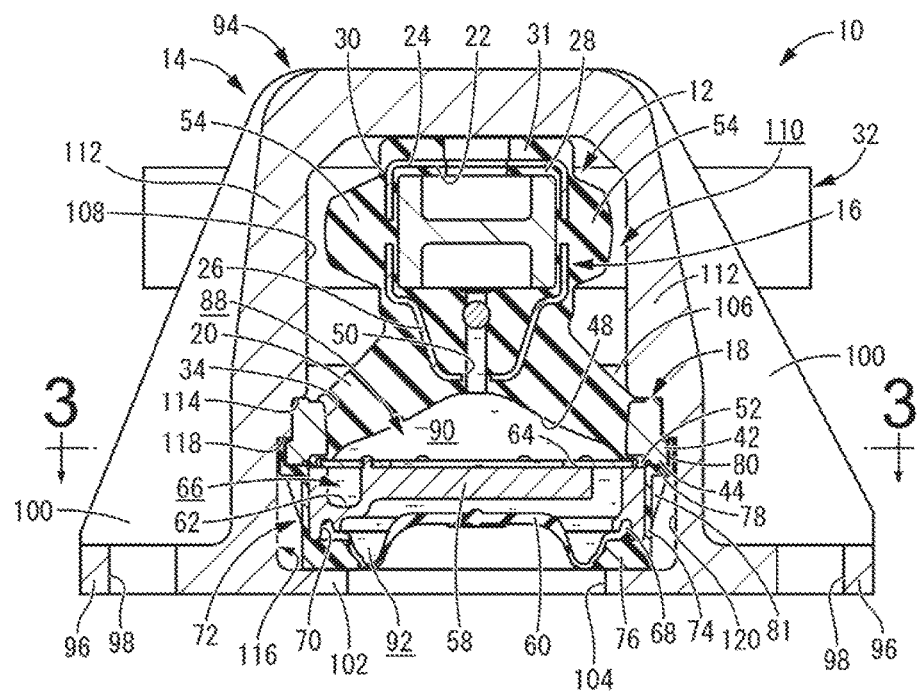
FIG. 2 is a vertical cross section view of the state with an inner bracket mounted on the engine mount shown in FIG. 1, taken along line 2-2 of FIG. 3.
FIG. 3 is a cross section view taken along line 3-3 of FIG. 2.
Figure 4:
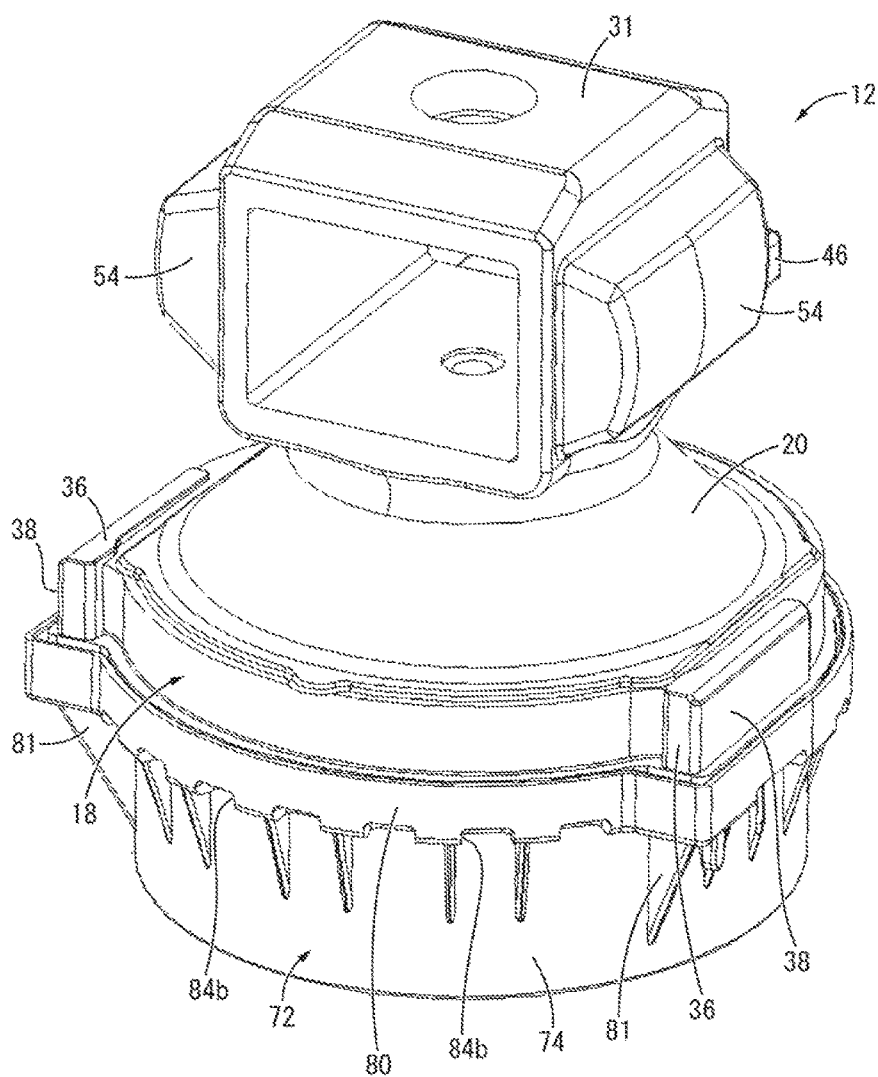
FIG. 4 is a perspective view of a mount main unit of the engine mount shown in FIG. 1.
Figure 5:
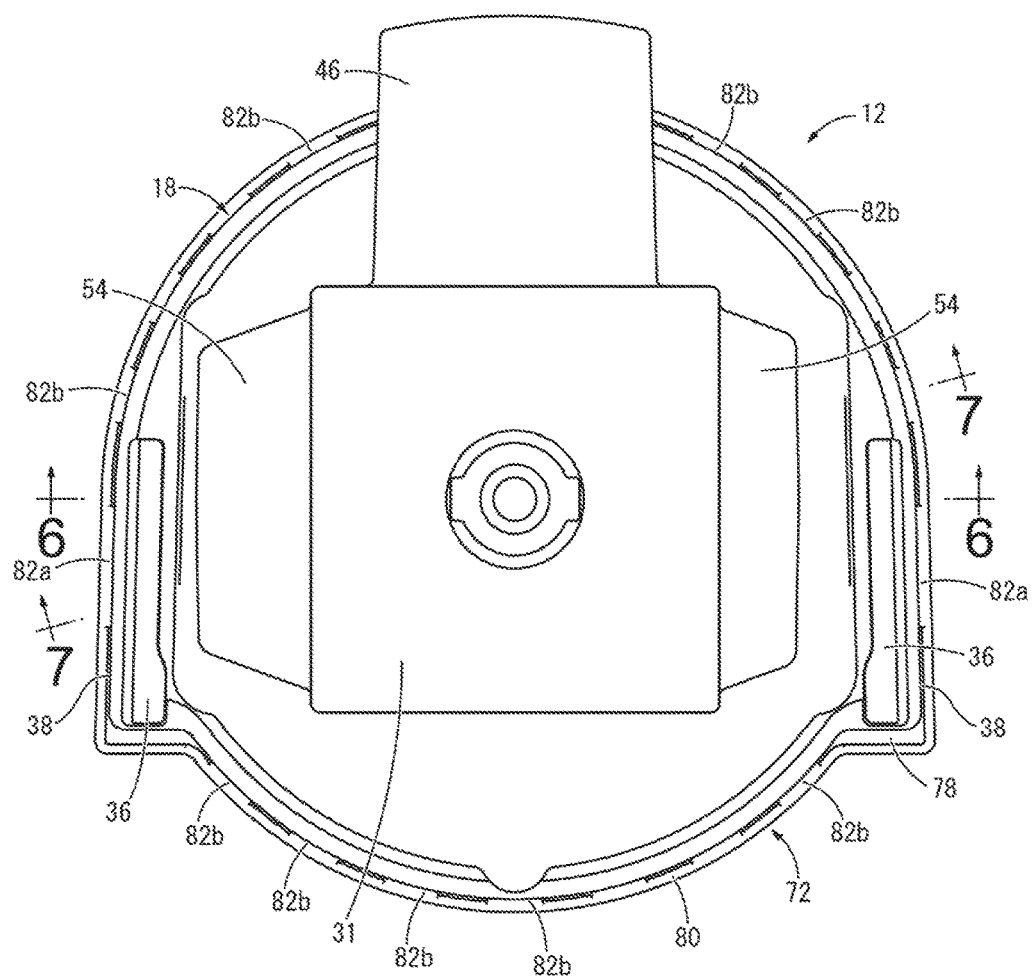
FIG. 5 is a plan view of the mount main unit shown in FIG. 4.

In FIGS. 1 to 3, as a first embodiment of a fluid-filled vibration-damping device constituted according to the present invention, an engine mount 10 of an automobile is shown. This engine mount 10 has a constitution for which an outer bracket 14 as a connecting member is mounted on a mount main unit 12 as a vibration damping device main unit shown in FIGS. 4 to 9. With the description below, the vertical direction as a rule means the up-down direction in FIG. 2 which is the mount axis direction. Also, FIGS. 5 to 8 showing the mount main unit 12, FIGS. 10 to 13 showing an integrally vulcanization molded component of a main rubber elastic body 20 described later, and FIGS. 14 to 17 showing a pressing member 72 described later are all shown enlarged in relation to FIGS. 2 and 3 to be more easily seeable.

In more detail, as shown in FIGS. 4 to 9, the mount main unit 12 comprises a first mounting member 16, a second mounting member 18, and the main rubber elastic body 20 that connects the mounting members elastically.

The first mounting member 16 is integrally equipped with a fitting part 24 having a roughly rectangular tube shape equipped with a hollow hole 22 extending straight, and an anchor part 26 having an inverted roughly truncated cone shell shape projecting downward from one side on the periphery of the fitting part 24. For the first mounting member 16, a highly rigid member formed using an iron, an aluminum alloy, a hard synthetic resin or the like is used. Also, the first mounting member 16 is arranged such that the center axis of the fitting part 24 extends in a direction roughly orthogonal to the mount axis direction. Besides, while a fitting rubber layer 28 is formed covering the entire periphery on the inner peripheral face of the fitting part 24, a covering rubber layer 30 is formed covering the entire periphery on the outer peripheral face of the fitting part 24. Furthermore, on the upper wall part of the fitting part 24, a top part buffer rubber layer 31 projecting facing upward in the mount axis direction is formed integrally with the covering rubber layer 30.

Also, as shown in FIG. 2, on the first mounting member 16, an inner bracket 32 is assembled in a press-fitted state from a side to the fitting part 24 to be fitted and fixed, and the first mounting member 16 is attached to a power unit via the inner bracket 32. Specifically, at the base end part of the inner bracket 32, a plurality of insertion holes for bolts for fixing to the power unit side are formed, while the tip end part of the inner bracket 32 has a roughly H shaped cross section, and extends in a straight line having an outer peripheral dimension corresponding to the hollow hole 22 of the first mounting member 16.

In addition, the second mounting member 18 is a highly rigid member made of a metal, in a thin walled, roughly round ring shape for which a large diameter through hole 34 is provided piercing through the center part in the mount axis direction. The inner peripheral face of the second mounting member 18 is a slanted and tapered surface expanding upward.

Furthermore, a pair of fixing parts 36, 36 are formed integrally on the second mounting member 18 so as to project on the outer peripheral face. This pair of fixing parts 36, 36 each have a thick walled, roughly block shape that expand in the axis-perpendicular direction on the outer peripheral face of the second mounting member 18, and are provided at sites positioned facing each other in the axis-perpendicular direction at the outer peripheral part of the second mounting member 18. Besides, both of the pair of fixing parts 36, 36 have outer peripheral faces 38, 38 extending to project roughly in parallel in the respective tangential directions from a pair of outer peripheral sites positioned opposite in one diametrical direction of the second mounting member 18. Also, an insertion pin 40 projecting downward is formed at each of the pair of fixing parts 36, 36. With this embodiment, the outer peripheral faces 38, 38 of the pair of fixing parts 36, 36 have tilted surfaces for each of which a slight tilt angle is given that is several degrees or less in the direction for which they mutually and gradually become separated, as they extend out toward the tangential direction from the opposite sites in one diametrical direction of the second mounting member 18.

Additionally, at the bottom part of the second mounting member 18, a press-fit part 42 projecting toward the outer periphery is formed continuously across the entire periphery. By that press-fit part 42 being formed, the outer peripheral face of the second mounting member 18 exhibits a stepped round tube shape, so that the bottom part of the second mounting member 18 has a larger outer diameter dimension than the top part. Furthermore, at the outer peripheral part of the second mounting member 18, a ring shaped abutting part 44 projecting downward is integrally formed, and the bottom surface of the inner peripheral part is positioned above the outer peripheral part. The outer peripheral face of the press-fit part 42 extends straightly and substantially without slanting in the axial direction. What is meant here by substantially without slanting includes a level of being an extraction taper provided to make removal of the metal mold easier during molding of the second mounting member 18.

Also, the first mounting member 16 is arranged above separated from the second mounting member 18 by a designated distance on the center axis of the second mounting member 18. The first mounting member 16 and the second mounting member 18 are elastically coupled to each other by the main rubber elastic body 20. The main rubber elastic body 20 has a thick walled, large diameter roughly truncated cone shape wherein the first mounting member 16 is adhered by vulcanization to the end part of the small diameter side, while the inner peripheral face of the second mounting member 18 is adhered by vulcanization to the outer peripheral face of the end part of the large diameter side.

The fitting rubber layer 28, the covering rubber layer 30, and the top part buffer rubber layer 31 adhered to the inner and outer peripheral faces of the first mounting member 16 are formed as an integrated unit on the main rubber elastic body 20. Therefore, the main rubber elastic body 20 is formed as an integrally vulcanization molded component equipped with the first mounting member 16 and the second mounting member 18 as shown in FIGS. 10 to 13.

Figure 11:
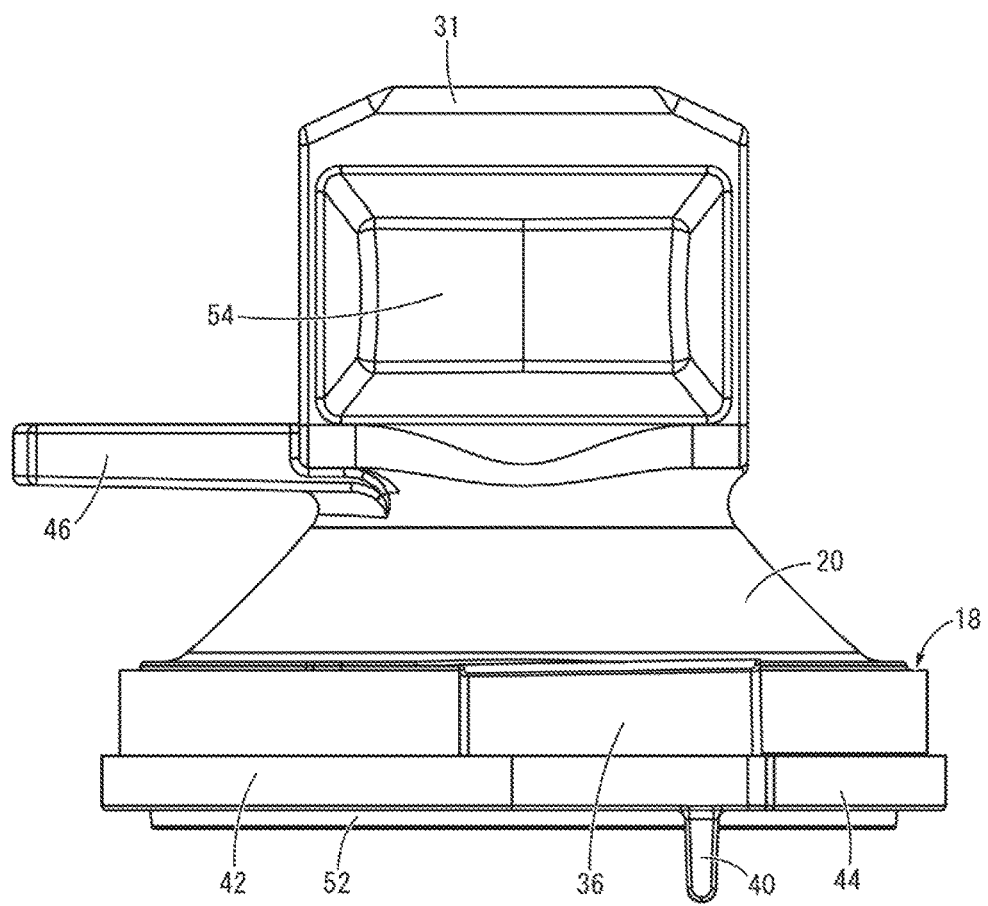
FIG. 11 is a left side view of the integrally vulcanization molded component of the main rubber elastic body shown in FIG. 10.
Figure 12:
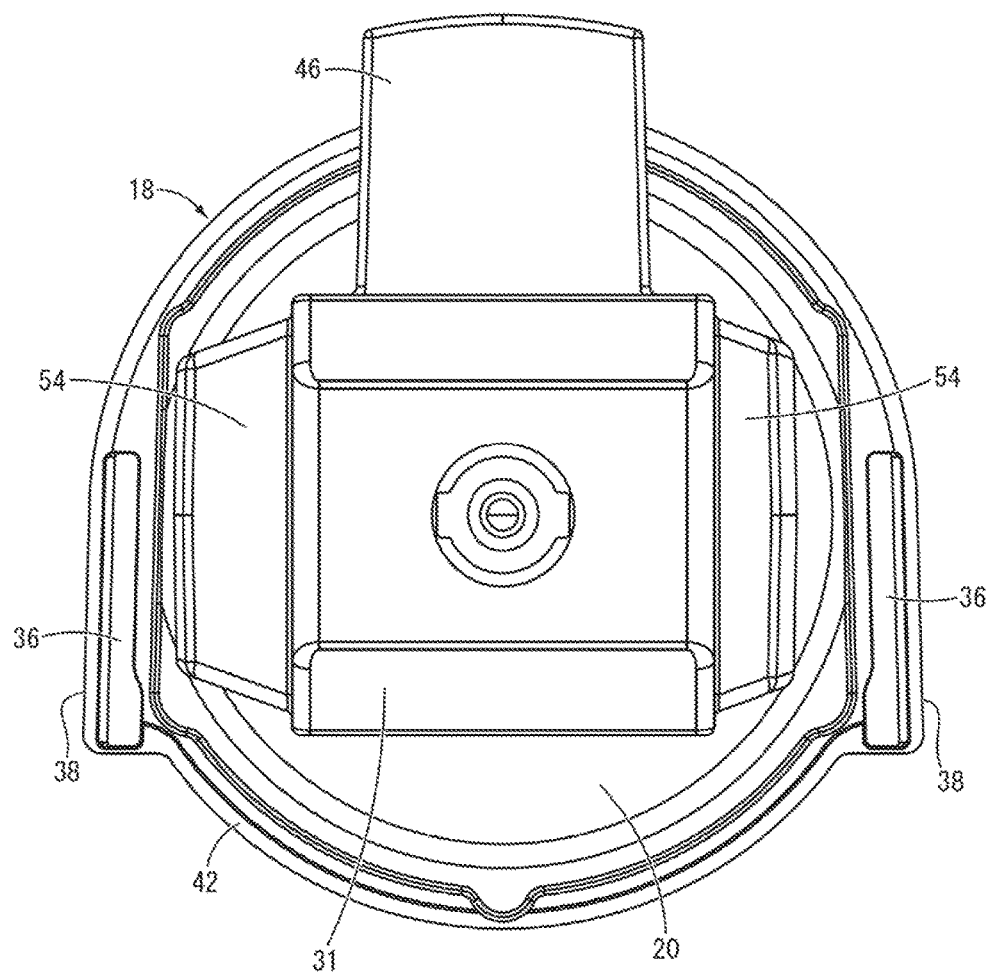
FIG. 12 is a plan view of the integrally vulcanization molded component of the main rubber elastic body shown in FIG. 10.

Also, as shown in FIGS. 11 and 12, a bottom part buffer rubber layer 46 is formed integrally on the main rubber elastic body 20 in the proximity of the end part on the small diameter side so as to extend out in a tongue shape or flat plate shape of a designated thickness to axially outside from the bottom wall part at one opening edge part of the fitting part 24 of the first mounting member 16. Yet further, a large diameter recess 48 is formed on the main rubber elastic body 20. The large diameter recess 48 is a recess exhibiting an inverted roughly mortar shape to open at the end surface of the large diameter side of the main rubber elastic body 20. Also, an injection hole 50 is provided on the main rubber elastic body 20 so as to extend piercing therethrough to the inside and outside. This injection hole 50 extends linearly with a fixed circular cross section on the main elastic axis of the main rubber elastic body 20, from the inside opening part provided at the center of the upper bottom part of the large diameter recess 48, to the outside opening part provided inside of the hollow hole 22, through the first mounting member 16.

Figure 13:
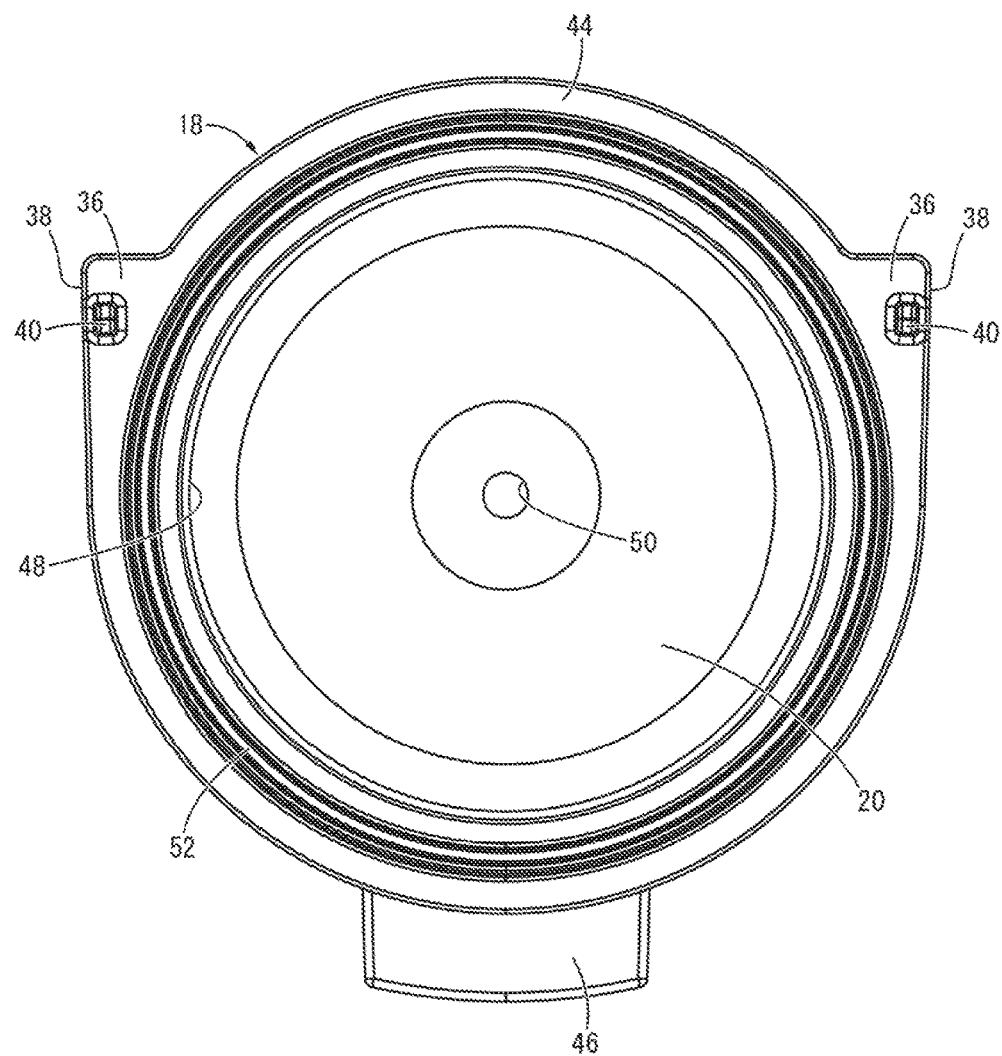
FIG. 13 is a bottom view of the integrally vulcanization molded component of the main rubber elastic body shown in FIG. 10.
Figure 14:
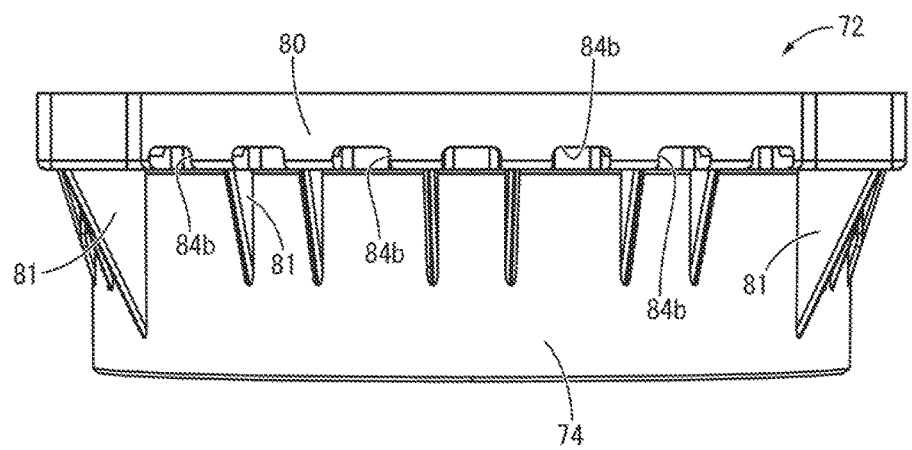
FIG. 14 is a front view of a sealing member of the mount main unit shown in FIG. 4.
Figure 15:
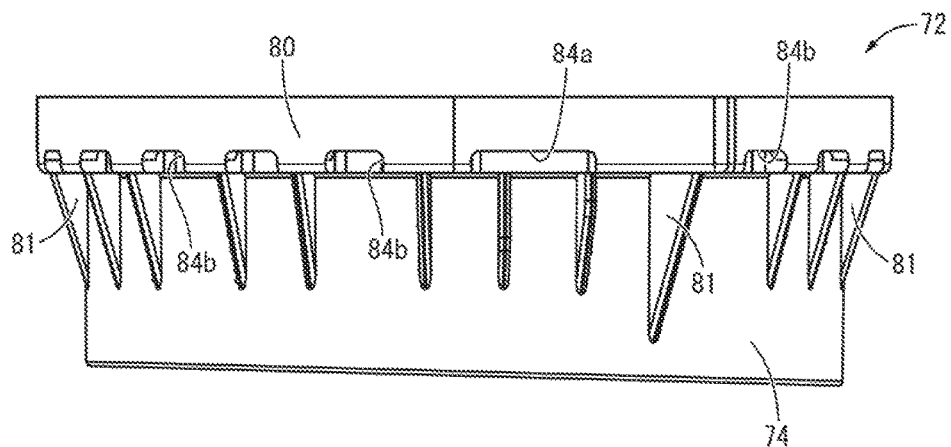
FIG. 15 is a left side view of the sealing member shown in FIG. 14.

Furthermore, as shown in FIG. 13, a sealing rubber 52 as a bunging member is formed on the outer peripheral side of the large diameter recess 48 of the main rubber elastic body 20. The sealing rubber 52 is a thin walled rubber layer adhered so as to cover the bottom surface of the second mounting member 18. With this embodiment, the sealing rubber 52 is formed integrally with the main rubber elastic body 20, to cover roughly the entire surface of the inner peripheral side of the abutting part 44 at the bottom surface of the second mounting member 18.

Yet further, a pair of side buffer rubber layers 54, 54 projecting to the outside of the first mounting member 16 are formed on the covering rubber layer 30 of the main rubber elastic body 20. The side buffer rubber layers 54, 54 project respectively to the reverse sides in the direction (lateral direction in FIG. 10) orthogonal to the extending direction of the hollow hole 22 of the first mounting member 16 (lateral direction in FIG. 11). The side buffer rubber layers 54, 54 are mountain shapes having a roughly trapezoidal cross section, and as shown in FIG. 1, in the stand alone state of the engine mount 10, a gap of a designated distance is formed between the projection tip end surfaces of the side buffer rubber layers 54, 54 and the opposite facing surfaces of the peripheral wall inner surface 108 of the mount holder part 110 described later.

Also, on the second mounting member 18 of an integrally vulcanization molded component of the main rubber elastic body 20, a partition member 58 and a flexible film 60 are arranged overlapping on the bottom side. Said another way, at the mount center axis direction of the second mounting member 18, the partition member 58 and the flexible film 60 are arranged overlapping on each other at the side opposite the side at which the main rubber elastic body 20 is arranged.

The partition member 58 overall has a thick walled, roughly large diameter round disk shape, and is formed using a metal, a hard synthetic resin or the like. Also, on the partition member 58, a peripheral groove 62 that extends at an approximate length slightly less than one periphery of the peripheral direction for the outer peripheral part is formed open at the top surface. Also, a thin walled, round disk shaped cover plate 64 is overlapped on the top surface of the partition member 58 to cover the opening of the peripheral groove 62, so that an orifice passage 66 that extends in the peripheral direction is formed. One end part in the peripheral direction of this orifice passage 66 pierces through the partition member 58 to open downward, while the other end part in the peripheral direction pierces through the cover plate 64 to open upward.

Meanwhile, the flexible film 60 is constituted by a rubber elastic film, easily deformable resin film or the like that has a thin walled roughly round disk shape overall, and by providing a designated slack at the center part in the diametrical direction, deformation is allowed easily. Also, a thick walled annular seal part 68 is formed integrally on the outer peripheral edge of the flexible film 60. By the annular seal part 68 being overlapped in a closely adhered state on the bottom surface of the outer peripheral part of the partition member 58, the flexible film 60 is arranged so as to cover along the entirety of the bottom surface of the partition member 58. On the outer peripheral part of the partition member 58, an annular positioning groove 70 extending in the peripheral direction is formed open to the bottom surface, and the top end of the annular seal part 68 is set so as to enter into this positioning groove 70.

Also, on these mutually overlapped partition member 58 and flexible film 60, the pressing member 72 as a sealing member is further attached so as to cover their outer peripheral faces.

As shown in FIGS. 14 to 17, the pressing member 72 has a roughly round tube shape overall, and is formed using a hard synthetic resin, a metal or the like. A sealing tube part 74 of the pressing member 72 is roughly the same as or slightly smaller than the axial length of the partition member 58, and an inner flange shaped annular abutting part 76 that expands to the inner peripheral side is formed integrally with the bottom end opening part.

In addition, on the top end opening part of the sealing tube part 74 of the pressing member 72, an annular plate part 78 as a step part in an outer flange shape is formed that expands to the outer peripheral side. Yet further, at the outer peripheral edge of the annular plate part 78, an attaching tube part 80 that projects upward is formed continuously on the entire periphery. Also, reinforcing ribs 81 are formed projecting on the outer peripheral face of the sealing tube part 74 with the pressing member 72. The reinforcing rib 81 is roughly a triangular plate shape for which the radial direction dimension becomes smaller as it moves downward, and is formed connected integrally with the outer peripheral face of the sealing tube part 74 and the bottom surface of the annular plate part 78.

Figure 9:
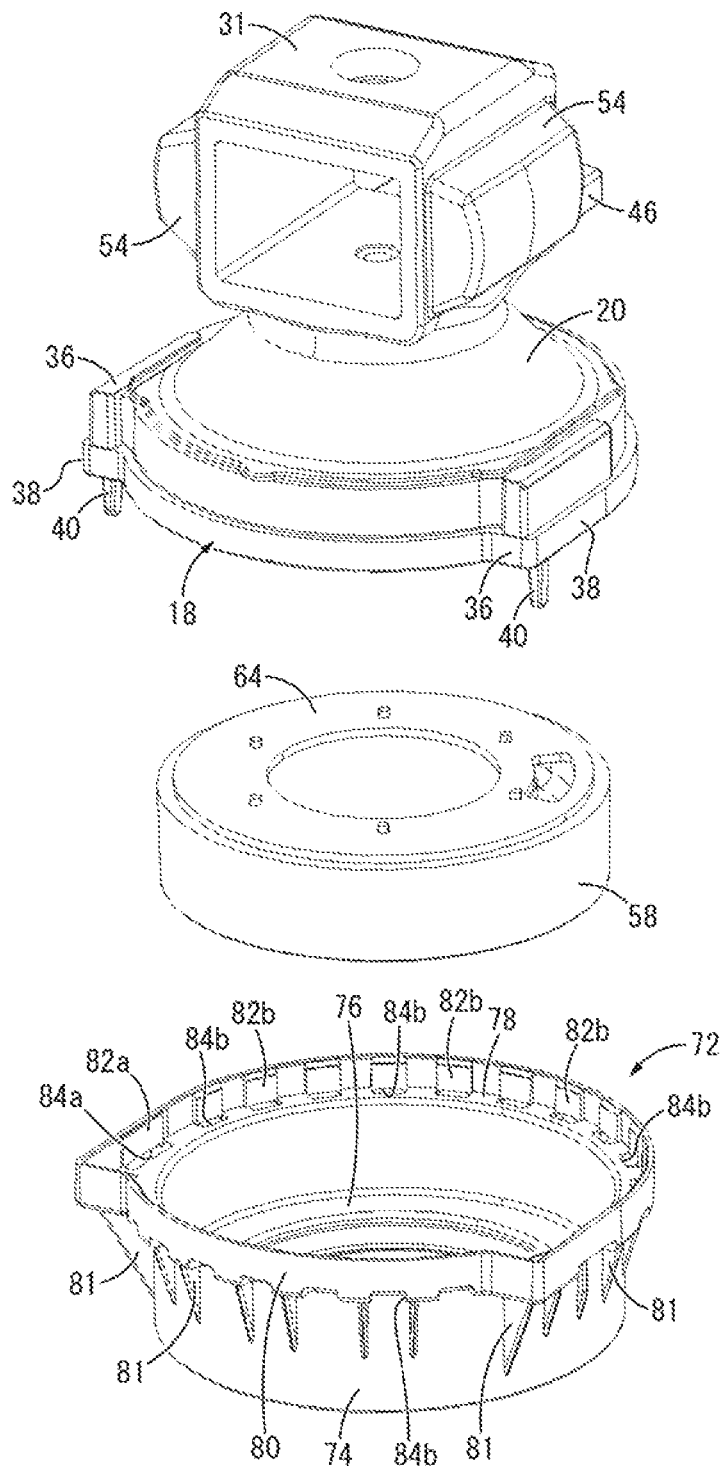
FIG. 9 is an exploded perspective view of the mount main unit shown in FIG. 4.
Figure 10:
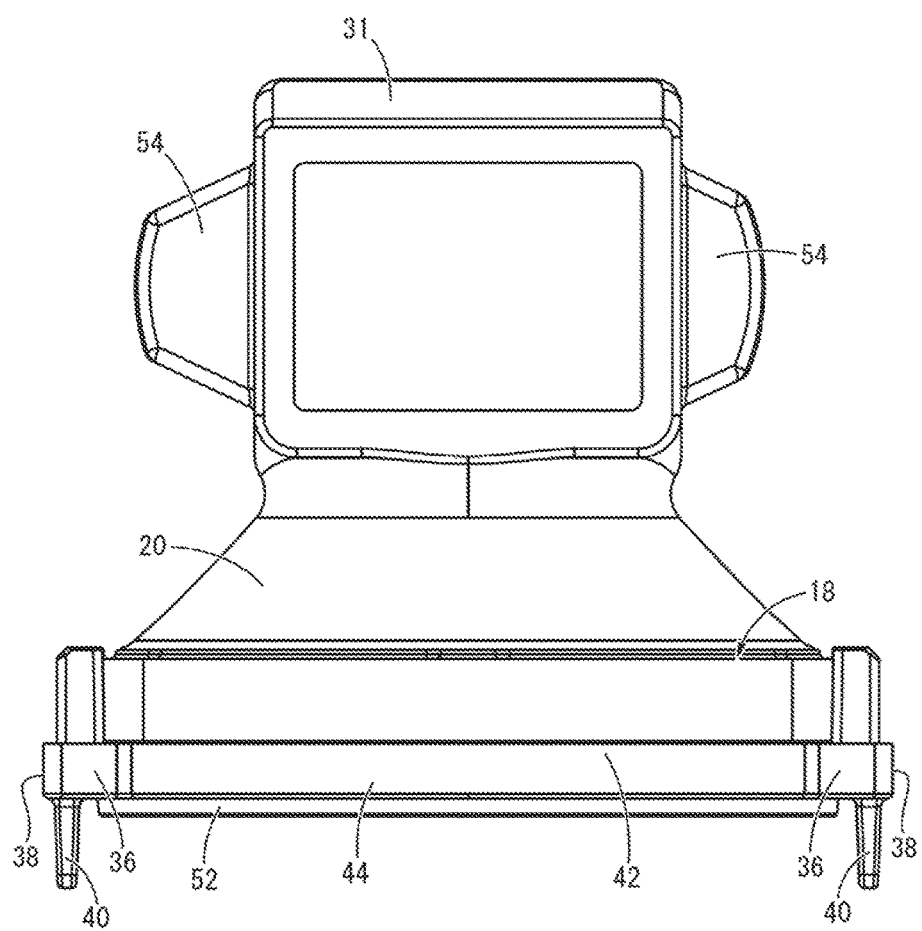
FIG. 10 is a front view of an integrally vulcanization molded component of a main rubber elastic body of the mount main unit shown in FIG. 4.
Figure 16:
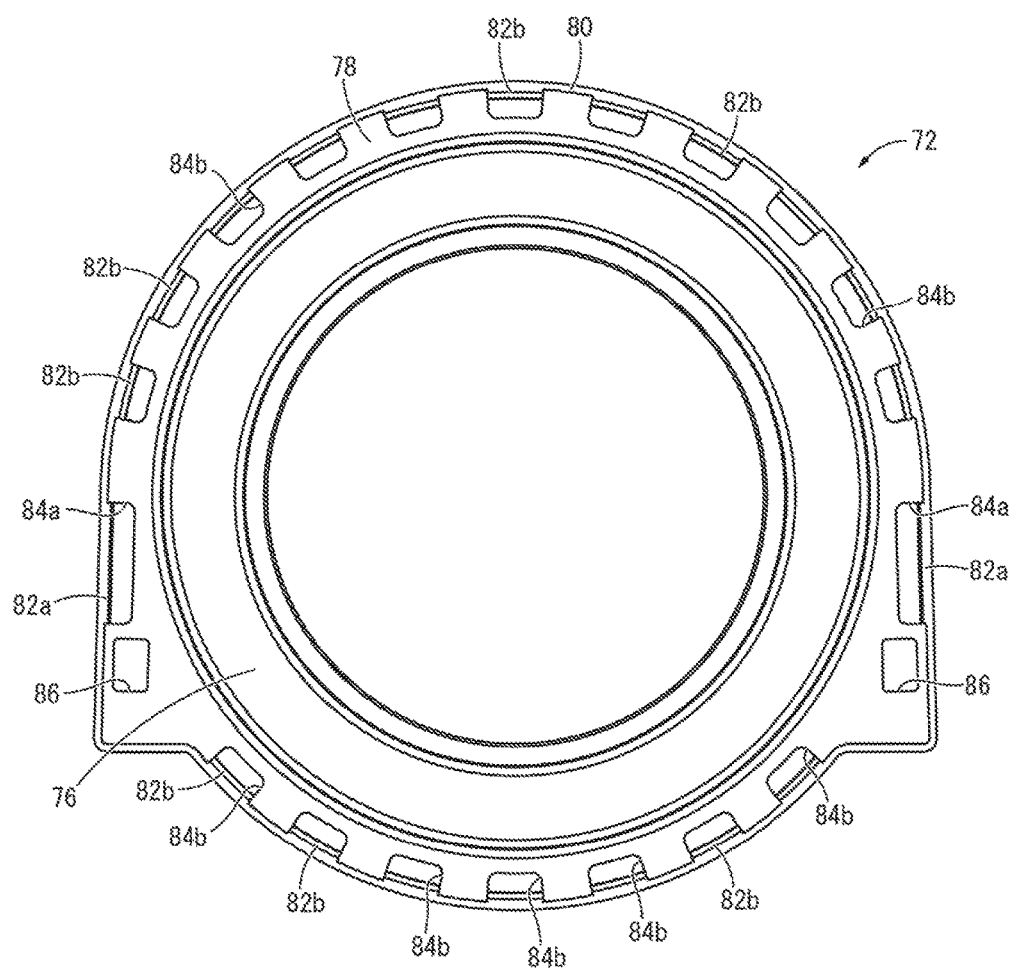
FIG. 16 is a plan view of the sealing member shown in FIG. 14.
Figure 17:
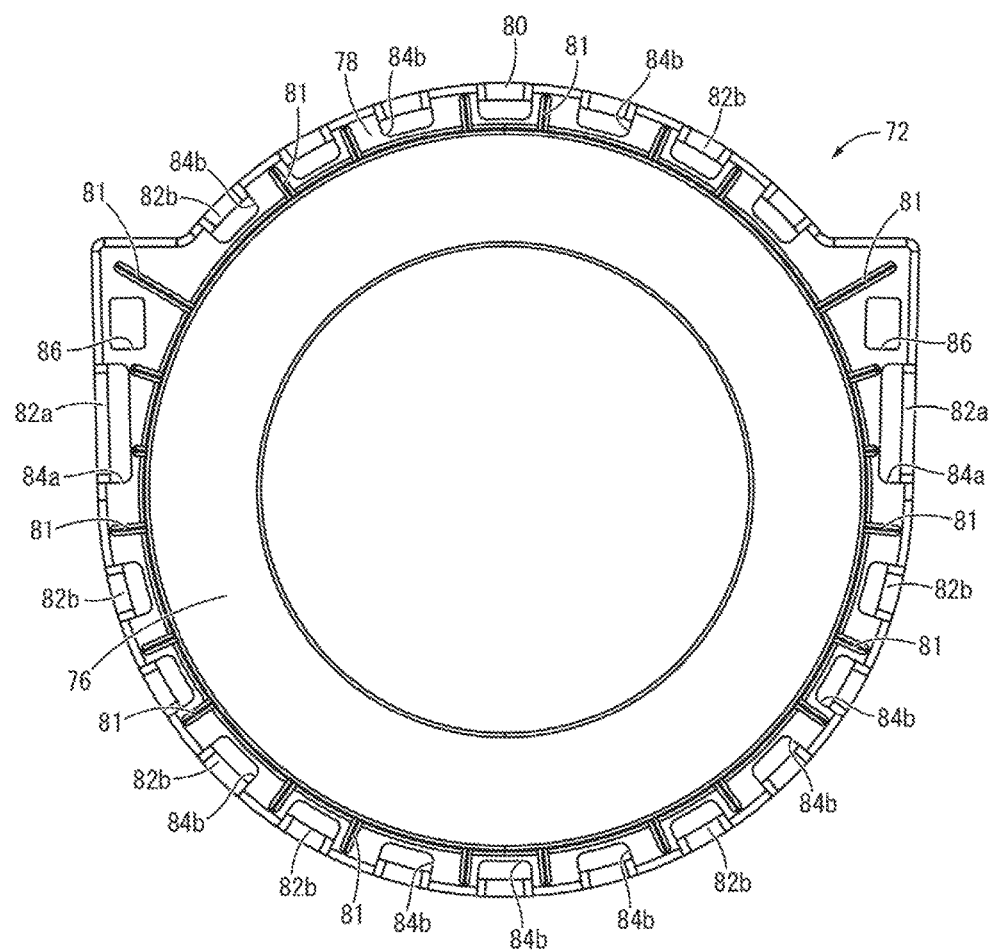
FIG. 17 is a bottom view of the sealing member shown in FIG. 14.

Here, a plurality of press-fit projections 82 (82$a$, 82$b$) are formed on the periphery on the attaching tube part 80 of the pressing member 72. The press-fit projections 82$a$, 82$b$ are formed protruding on the inner peripheral face of the attaching tube part 80 as shown in FIGS. 9 and 16, so that the inner dimension of the axis-perpendicular direction of the attaching tube part 80 becomes partially smaller on the periphery at the parts at which the press-fit projections 82a, 82b are formed. By so doing, the inner dimension of the attaching tube part 80 is smaller than the outline dimension in the axis-perpendicular direction of the press-fit part 42 with the second mounting member 18, at the parts for which the press-fit projections 82a, 82b are formed. Meanwhile, the inner dimension of the attaching tube part 80 is larger than the outline dimension in the axis-perpendicular direction of the press-fit part 42 at the parts away from the press-fit projections 82a, 82b in the peripheral direction. Also, each press-fit projection 82a/82b of this embodiment continuously extends at respective prescribed lengths in the peripheral direction and the axial direction, and the projecting tip end of the press-fit projection 82a/82b is the surface corresponding to the outer peripheral face of the press-fit part 42 with the second mounting member 18. Furthermore, the projecting tip end surface of the press-fit projection 82a/82b curves and expands in the peripheral direction, and in the axial direction, extends straight substantially without slanting. Yet further, the press-fit projections 82a, 82b are formed at a length that reaches the proximal end of the attaching tube part 80 in the axial direction, and are provided continuously across the entire length in the axial direction of the attaching tube part 80.

Besides, transmission prevention holes 84a, 84b as transmission prevention parts are formed at a plurality of locations on the periphery on the annular plate part 78 of the pressing member 72. The transmission prevention holes 84a, 84b are formed by piercing through the annular plate part 78 vertically in the thickness direction, and have a roughly rounded corner rectangular cross section extending at a designated length in the peripheral direction. With this embodiment, the plurality of transmission prevention holes 84a, 84b are arranged dispersed across roughly the entire periphery, and transmission prevention holes 84a formed at the parts corresponding to the pair of fixing parts 36, 36 for which the deformation rigidity is relatively large have a greater length in the peripheral direction than that of the other transmission prevention holes 84b. Also, the transmission prevention holes 84a, 84b of this embodiment are formed at the same positions in the peripheral direction as the plurality of press-fit projections 82a, 82b to open at the parts including the axial extension lines of the inner peripheral faces of the press-fit projections 82a, 82b. Said another way, with the top view, the outer peripheral ends of the transmission prevention holes 84a, 84b reach up to the inner peripheral ends of the press-fit projections 82a, 82b. The reinforcing ribs 81 provided on the bottom surface of the annular plate part 78 are arranged away from the opening parts of the transmission prevention holes 84a, 84b with the annular plate part 78.

Furthermore, the peripheral length dimension of the transmission prevention holes 84a, 84b is roughly the same as the peripheral length dimension of the press-fit projections 82a, 82b formed at the same position. Therefore, the press-fit projections 82a provided at the positions corresponding to the transmission prevention holes 84a have a greater peripheral length than that of the press-fit projections 82b provided at the positions corresponding to the transmission prevention holes 84b. The peripheral length dimension of the transmission prevention holes 84a, 84b can also be made smaller than the peripheral length dimension of the press-fit projections 82a, 82b. However, it is preferable that it be not less than the peripheral length dimension of the press-fit projections 82a, 82b, and that the press-fit projections 82a, 82b be arranged in an intermediate portion in the peripheral direction of the transmission prevention holes 84a, 84b.

Also, with the annular plate part 78 of the pressing member 72, at each of the parts corresponding to the pair of fixing parts 36, 36 of the second mounting member 18, a positioning hole 86 is formed. The positioning hole 86 is formed at a part for which the transmission prevention hole 84a is separated in the peripheral direction, and pierces vertically through the annular plate part 78 with a roughly fixed rounded corner rectangular cross section.

Figure 18:
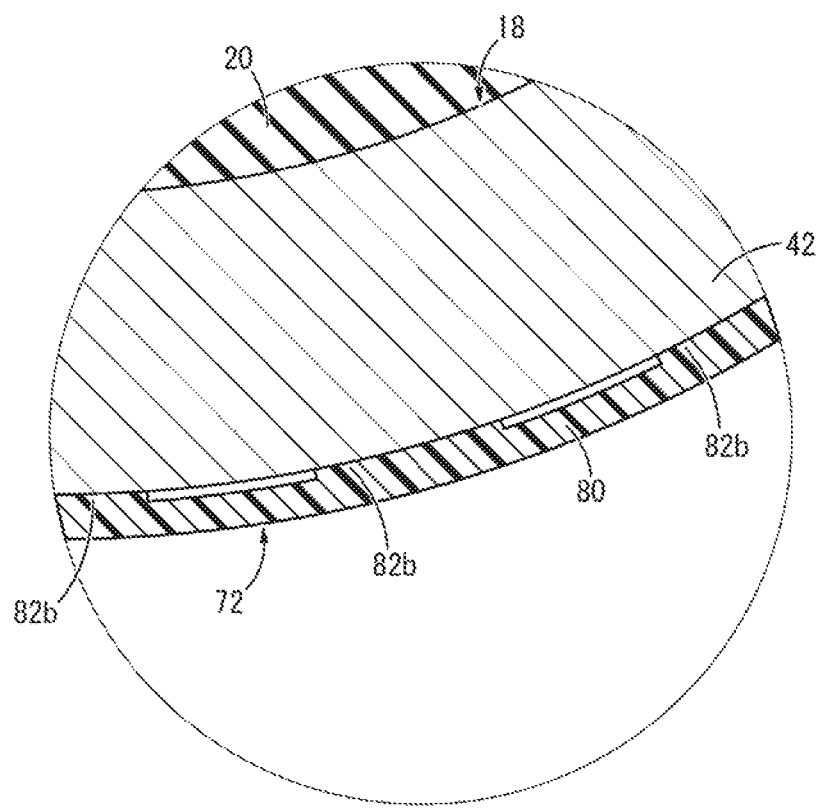
FIG. 18 is an enlarged transverse cross section view of a principal part showing part A of FIG. 8.

Also, the sealing tube part 74 of the pressing member 72 is fitted externally onto the partition member 58, and on the annular abutting part 76 of the pressing member 72, the annular seal part 68 of the flexible film 60 is sandwiched and held between the annular abutting part 76 and the bottom end surface of the installed partition member 58. Also, the second mounting member 18 is inserted into the attaching tube part 80 of the pressing member 72, so that the annular plate part 78 of the pressing member 72 is overlapped on the bottom end surface of the abutting part 44 with the second mounting member 18, while the attaching tube part 80 of the pressing member 72 is overlapped on the outer peripheral face of the press-fit part 42 of the second mounting member 18. Furthermore, as shown enlarged in FIG. 18, the press-fit part 42 of the second mounting member 18 is press-fitted at the formation parts of the press-fit projections 82a, 82b with the attaching tube part 80 of the pressing member 72, whereby the pressing member 72 is assembled to the second mounting member 18, and resistance force to falling out in the axial direction acts between the second mounting member 18 and the attaching tube part 80. As shown in FIG. 18, at the part for which the press-fit projections 82a, 82b are separated in the peripheral direction, a gap is formed between the inner peripheral face of the attaching tube part 80 and the outer peripheral face of the second mounting member 18.

Also, by the second mounting member 18 being press-fitted into the attaching tube part 80, reaction force to the fall out resistance force at the part where the press-fit projections 82a, 82b are formed on the periphery is applied to the attaching tube part 80, so that stress acts on the attaching tube part 80. This stress is transmitted to the sealing tube part 74 side via the annular plate part 78, but since the transmission prevention holes 84a, 84b are formed on the transmission path, the transmission of stress to the sealing tube part 74 is reduced. By so doing, the deformation volume of the sealing tube part 74 is reduced, thereby maintaining a state with the inner peripheral face of the sealing tube part 74 superposed to the outer peripheral face of the partition member 58.

With this embodiment, by the pair of fixing parts 36, 36 of the second mounting member 18 being locked in the peripheral direction on the inner peripheral face of the attaching tube part 80 of the pressing member 72, the relative rotation amounts of the second mounting member 18 and the pressing member 72 in the peripheral direction are restricted. Furthermore, by the insertion pins 40 formed respectively on the pair of fixing parts 36, 36 of the second mounting member 18 being inserted through the positioning holes 86 formed on the annular plate part 78 of the pressing member 72, the relative positions of the second mounting member 18 and the pressing member 72 in the axis-perpendicular direction can match each other. Also, by the peripheral engagement of the insertion pins 40 in relation to the positioning holes 86 and the peripheral engagement between the pair of fixing parts 36, 36 of the second mounting member 18 and the inner peripheral face of the attaching tube part 80, a positioner is constituted for positioning the second mounting member 18 and the pressing member 72 to each other in the peripheral direction.

By the pressing member 72 being attached to the second mounting member 18 by the press-fitting of the second mounting member 18 into the attaching tube part 80 in this way, the partition member 58 and flexible film 60 in a housed state positioned inside the pressing member 72 are attached overlapping on the bottom side of the second mounting member 18. Also, between axial opposite surfaces of the large diameter recess 48 of the main rubber elastic body 20 and flexible film 60, a fluid chamber 88 is defined that is sealed fluid tightly in relation to the external space and in which non-compressible fluid or liquid is sealed.

Besides, this fluid chamber 88 is partitioned by the partition member 58, and on the top side of the partition member 58, formed is a pressure-receiving chamber 90 whose wall is partially constituted by the main rubber elastic body 20, and for which pressure fluctuation is directly caused based on elastic deformation of the main rubber elastic body 20 when vibration is input to roughly the mount axis direction between the first and second mounting members 16 and 18. Meanwhile, on the bottom side of the partition member 58, formed is an equilibrium chamber 92 whose wall is partially constituted by the flexible film 60, and for which the internal pressure fluctuation can be absorbed and reduced based on the flexible deformation of the flexible film 60.

Yet further, the pressure-receiving chamber 90 and the equilibrium chamber 92 are in communication with each other through the orifice passage 66 formed in the partition member 58, and the sealed fluid is made to flow through the orifice passage 66 based on the relative pressure fluctuation between the pressure-receiving chamber 90 and the equilibrium chamber 92. Thus, using the resonance action or the like of the fluid that flows in the orifice passage 66, the vibration damping effect is exhibited on input vibration.

The injection of non-compressible fluid into the fluid chamber 88 can be realized also by, for example, performing the attachment of the partition member 58, the flexible film 60, and the pressing member 72 relative to the integrally vulcanization molded component of the main rubber elastic body 20 inside non-compressible fluid or the like. However, with this embodiment, it can be done by, after attaching those members, injecting non-compressible fluid through the injection hole 50 before press-fitting and adhering a spherical body for sealing into the injection hole 50.

Here, in a state with the partition member 58, the flexible film 60 and the pressing member 72 attached to the integrally vulcanization molded component of the main rubber elastic body 20, specifically, with the mount main unit 12 in a stand alone state before attaching it to the bottom side part of the outer bracket 14, sealing in relation to the external space of the fluid chamber 88 is realized with a temporary seal by press-fitting the second mounting member 18 into the pressing member 72.

Specifically, with the pressing member 72, the partition member 58 is overlapped to the annular abutting part 76 with the annular seal part 68 of the flexible film 60 clamped therebetween, making it possible to apply axial pressing force on the annular seal part 68 between the annular abutting part 76 and the partition member 58. Also, the top surface of the partition member 58 housed in the sealing tube part 74 of the pressing member 72 is overlapped in relation to the bottom end surface of the second mounting member 18 on the inner peripheral side of the abutting part 44 with the sealing rubber 52 clamped therebetween, and it is possible to apply axial pressing force on the sealing rubber 52 between the partition member 58 and the second mounting member 18.

By so doing, the reaction force against pressing the annular seal part 68 and the sealing rubber 52 in the axial direction is applied to the axial separation side between the second mounting member 18 and the pressing member 72. Also, in resistance to this pressing reaction force, by the second mounting member 18 being press-fitted into the pressing member 72, the pressing member 72 is held at a position approaching the second mounting member 18 in the axial position. As a result, using the holding force such as frictional force or the like by the second mounting member 18 being press-fitted into the pressing member 72, sealing pressure in the axial direction is applied to the annular seal part 68 and the sealing rubber 52. Owing to these seal parts 52 and 68, a fluid tight temporary seal is respectively achieved between the second mounting member 18 and the partition member 58, and between the partition member 58 and the pressing member 72, and the fluid tightness of the fluid chamber 88 is maintained.

It is also possible to improve sealing properties by having the sealing rubber 52 be sandwiched in addition between the overlapping surfaces of the annular plate part 78 of the pressing member 72 and a part of the second mounting member 18 on the inner peripheral side of the abutting part 44.

Also, when the second mounting member 18 is press-fitted to the attaching tube part 80 of the pressing member 72, pressing and expansion direction force acts on the attaching tube part 80 in the radial direction. Also, stress that accompanies press-fitting acting on the attaching tube part 80 is transmitted to the sealing tube part 74 via the annular plate part 78. Here, press-fit projections 82a, 82b are formed on the attaching tube part 80, and the second mounting member 18 is press-fitted partially on the periphery to the attaching tube part 80 at the part at which the press-fit projections 82a, 82b are formed. Meanwhile, on the periphery of the annular plate part 78, the transmission prevention holes 84a, 84b are each formed at the same peripheral direction position as the respective press-fit projection 82a/82b.

By so doing, the stress that accompanies press-fitting of the second mounting member 18 to the attaching tube part 80 acts mainly on the parts at which the press-fit projections 82a, 82b are formed on the periphery. On the other hand, the stress that is transmitted to the sealing tube part 74 from the parts at which the press-fit projections 82a, 82b are foamed with the attaching tube part 80 is reduced by the transmission prevention holes 84a, 84b formed on the parts for which stress is transmitted to the sealing tube part 74. Specifically, by the transmission prevention holes 84a, 84b being formed at the same peripheral direction positions as the press-fit projections 82a, 82b, at the parts at which the press-fit projections 82a, 82b are formed on the periphery, it is easier for the attaching tube part 80 and the annular plate part 78 to be deformed, and by the decrease in deformation rigidity, the stress that accompanies press-fitting that is transmitted to the sealing tube part 74 is reduced.

Because of that, deformation of the sealing tube part 74 due to transmission of stress accompanying press-fitting is reduced or prevented, making it possible to avoid formation of large gaps between the inner peripheral face of the sealing tube part 74 and the outer peripheral face of the partition member 58. Therefore, it is possible to avoid problems such as the sealing rubber 52 entering between the sealing tube part 74 and the partition member 58 in the radial direction, so as to effectively obtain the target sealing performance.

On the mount main unit 12 constituted as noted above, the outer bracket 14 is attached, and the mount main unit 12 is attached as the mount main unit 12 being inserted from the side into the installation space formed at roughly the center of the outer bracket 14. The outer bracket 14 is a highly rigid member formed using iron, aluminum alloy or the like. For reasons of lightness, easiness in ensuring rigidity by the member thickness, a high degree of freedom of design and the like, die cast formed articles made of aluminum alloy can be suitably used.

In more detail, as shown in FIGS. 1 to 3, the outer bracket 14 has a gate shaped part 94 provided straddling the installation space, and a pair of base parts 96, 96 with a flat plate shape expanding in the direction mutually separating are provided on both leg bottom ends of the gate shaped part 94. On the respective base parts 96, 96, formed are insertion holes 98 through which fixing bolts are inserted. By the fixing bolts inserted through the insertion holes 98, it is possible to fix the outer bracket 14 using bolts to the vehicle body. Also, between both leg parts of the gate shaped part 94 and the respective base parts 96, reinforcing parts 100, 100 that connect both edges in the member width direction are respectively and integrally formed.

Also, on the bottom end opening part of the gate shaped part 94, a pressing bottom part 102 that expands across the pair of base parts 96, 96 is integrally formed. A round through hole 104 is formed at the center part of the pressing bottom part 102, and the inner diameter dimensions of this through hole 104 are roughly the same as the inner diameter dimensions of the annular abutting part 76 of the pressing member 72 of the mount main unit 12.

Yet further, a side vertical wall 106 made to cover the bottom side part of the opening of one side is formed integrally on the gate shaped part 94. This side vertical wall 106 is bent in roughly an arc shape roughly concentrically with the through hole 104 of the pressing bottom part 102, and projects facing outward from the opening of one side of the gate shaped part 94.

Also, by this side vertical wall 106 being provided, at the bottom side part of the gate shaped part 94, a mount holder part 110 is formed as an installation space, equipped with a roughly arc shaped peripheral wall inner surface 108 that extends with the length of half a periphery or greater in the peripheral direction, and the pressing bottom part 102 that has the through hole 104. This mount holder part 110 opens facing the side opposite the side vertical wall 106, and the opening part is the insertion port into which the mount main unit 12 is inserted and attached.

In addition, on the peripheral wall inner surface 108 of the mount holder part 110, at the opposite inner surface of a pair of leg parts 112, 112 of the gate shaped part 94, a step shaped pressing upper surface 114 is formed facing opposite the top surface of the pressing bottom part 102 in the vertical direction. Also, between the facing surfaces of the top surface of the pressing bottom part 102 and the pressing upper surface 114, clasping grooves 116, 116 are formed to be open facing the insertion port.

With this embodiment, at the inner surface of the pair of leg parts 112, 112 with the mount holder part 110, a step 118 that extends along roughly the entire length of the width direction (direction orthogonal to the paper surface in FIG. 2) of the leg part 112 in the height direction middle part is formed, and the part on the side of the pressing bottom part 102 lower than the step 118 has an inner peripheral face shape with a larger diameter than that of the part on the side of the pressing upper surface 114 higher than the step 118.

Also, groove bottom surfaces 120, 120 of the clasping grooves 116, 116 formed on the opposite facing inner surfaces of the pair of leg parts 112, 112 of the gate shaped part 94 are tilted surfaces that open and expand so that the distance between the opposing surfaces gradually becomes larger facing the insertion port side of the mount main unit 12 with the mount holder part 110. Besides, the tilt angle of these tilted groove bottom surfaces 120, 120 is roughly the same as that of the pair of outer peripheral faces 38, 38 with the pair of fixing parts 36, 36 of the second mounting member 18 with the mount main unit 12, corresponding thereto.

Also, to the outer bracket 14 constituted in this way, the mount main unit 12 is inserted from the side of the mount holder part 110 and attached. As a result, the part that is on the axial lower side of the second mounting member 18 of the mount main unit 12 is fit into the clasping groove 116 from the insertion port to be mated and fixed.

Specifically, by the pair of fixing parts 36, 36 with the second mounting member 18 being inserted from the insertion port in the clasping grooves 116, 116, the outer peripheral faces 38, 38 of the fixing parts 36, 36 are abutted on the respective groove bottom surfaces 120, 120 of the clasping grooves 116, 116. By so doing, both fixing parts 36, 36 are fit and fixed in a press-fitted state in relation to the respective clasping grooves 116, 116.

Also, with this embodiment, each of the groove bottom surfaces 120, 120 of the clasping grooves 116, 116 is a tilted surface, which can be used as a mold removal taper at the time of demolding during molding of the outer bracket 14. By so doing, the work of die cast molding of the outer bracket 14 is still easier. Furthermore, the groove bottom surfaces 120, 120 of the pair of clasping grooves 116, 116 are tilted such that the distance between the opposite surfaces gradually grows greater toward the insertion port of the clasping grooves 116. Accordingly, it is possible to insert the mount main unit 12 inside the mount holder part 110 easily.

Figure 6:
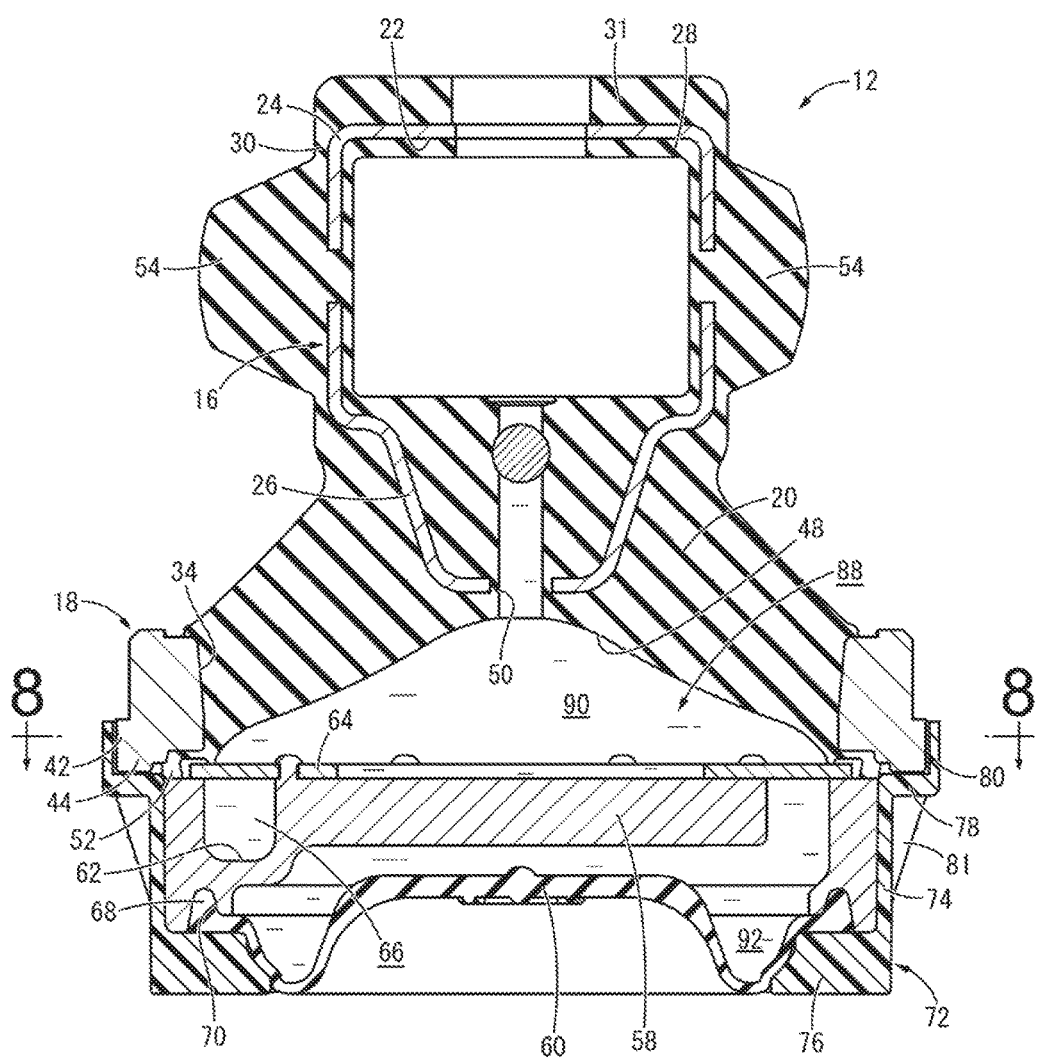
FIG. 6 is a cross section view taken along line 6-6 of FIG. 5.
Figure 7:
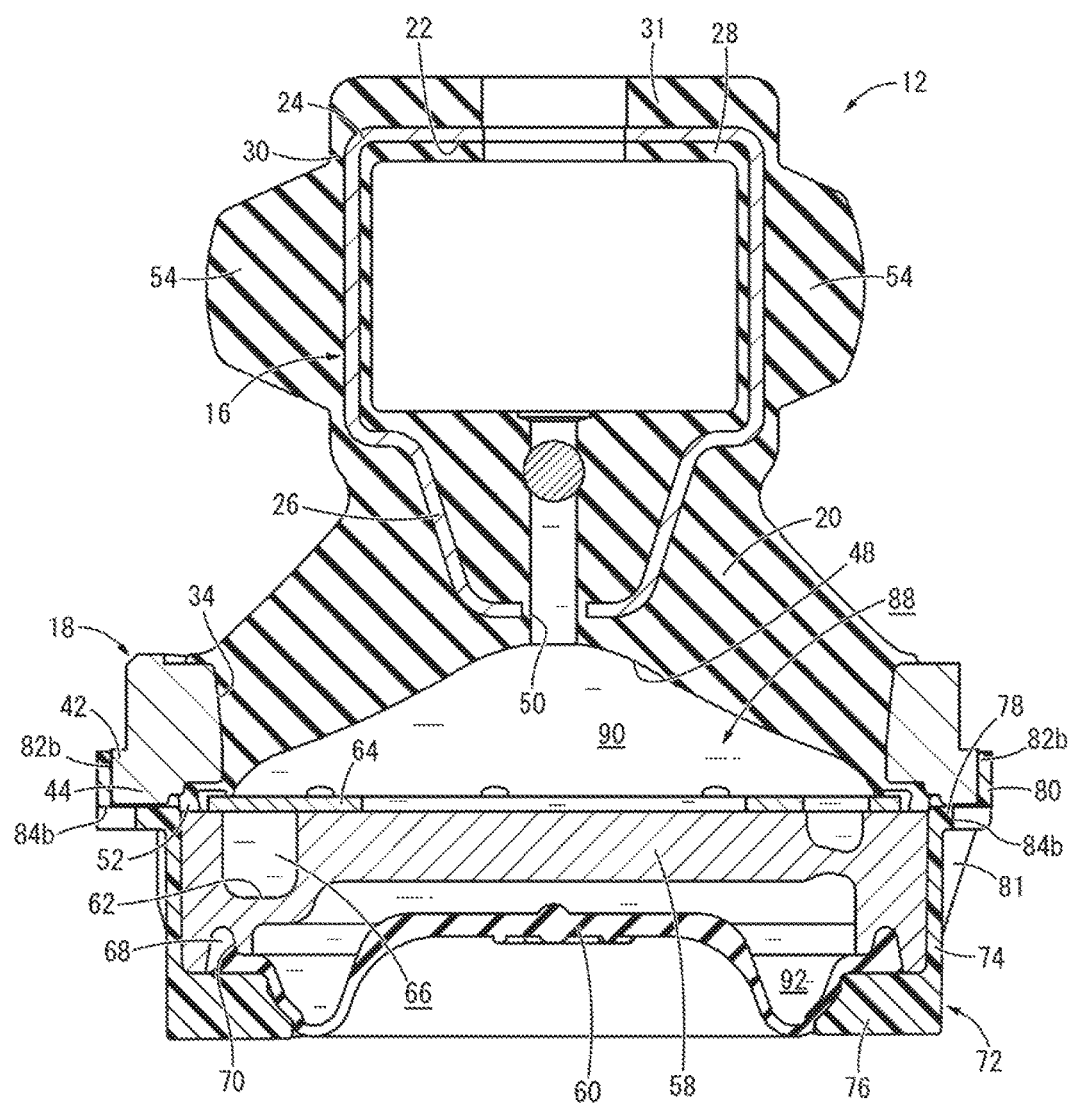
FIG. 7 is a cross section view taken along line 7-7 of FIG. 5.
Figure 8:
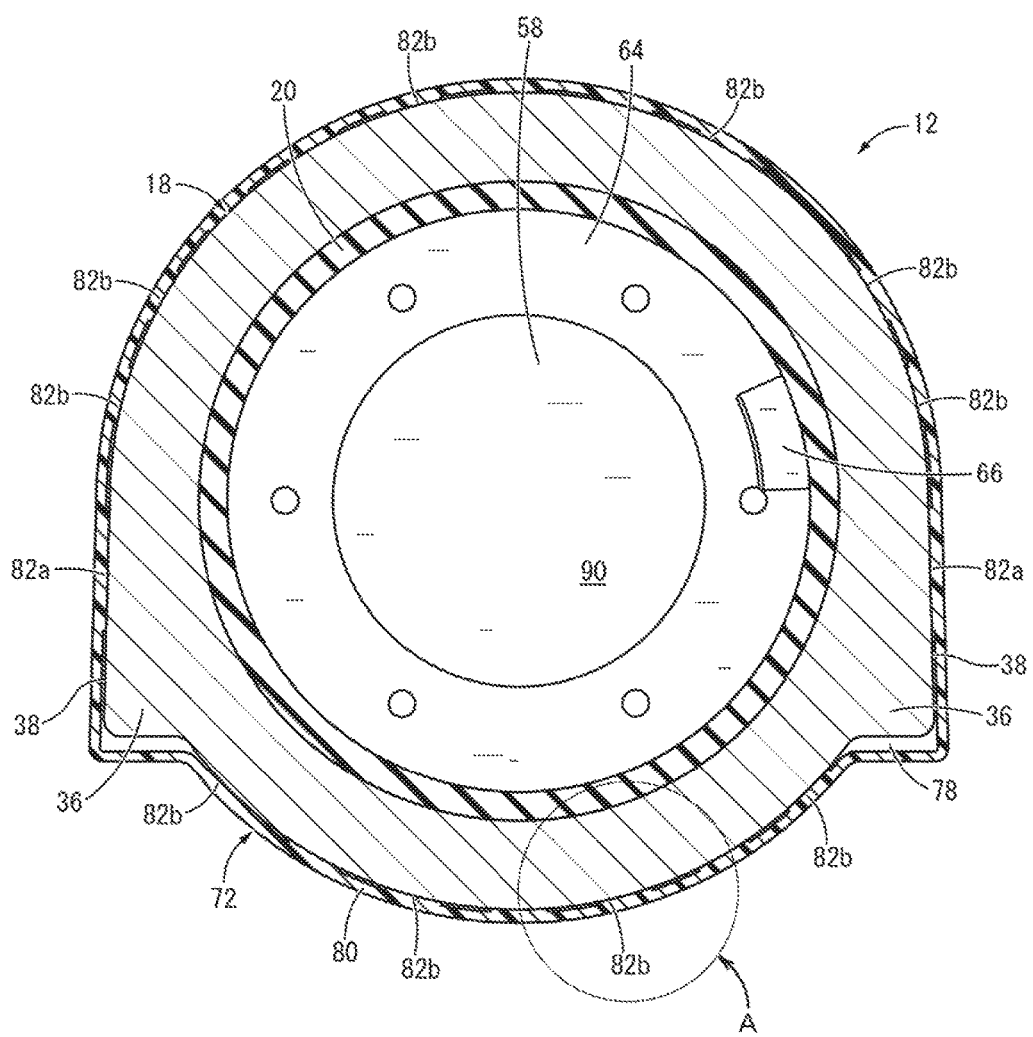
FIG. 8 is a cross section view taken along line 8-8 of FIG. 6.

Furthermore, by the mount main unit 12 being fit into the clasping grooves 116 of the outer bracket 14, a pressing force is applied in the mutually approaching direction in the axial direction on the second mounting member 18 and the pressing member 72. Specifically, with the mount main unit 12 alone as shown in FIGS. 6 and 7, by the second mounting member 18 being press-fitted into the attaching tube part 80 of the pressing member 72, a resistance force is exhibited in relation to the pressing resistance force of the sealing rubber 52 and the annular seal part 68 in a temporarily sealed state. Compared to the mount axis direction distance between the top end surface of the second mounting member 18 and the bottom end surface of the pressing member 72 in the temporarily sealed state, the distance between the opposite facing surfaces of the top surface of the pressing bottom part 102 and the pressing upper surface 114 with the clasping grooves 116 of the outer bracket 14 is set to be smaller.

Figure 19A:
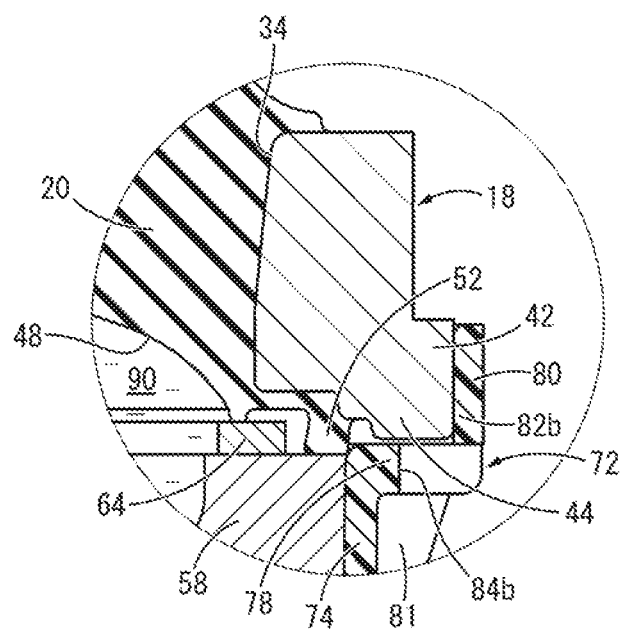
FIGS. 19A and 19B are vertical cross section views of a principal part for explaining seal of the engine mount shown in FIG. 1, where
Figure 19B:
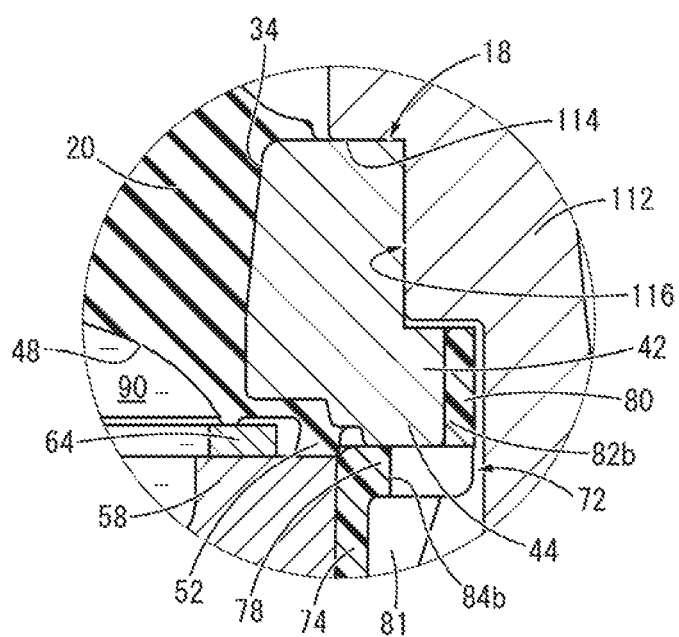

As a result, when the mount main unit 12 in the temporarily sealed state is fit into the clasping groove 116 of the outer bracket 14, as shown by the enlarged view in FIGS. 19A and 19B, the second mounting member 18 and the pressing member 72 are further displaced relative to each other in a mutually approaching direction in the mount axis direction, and further compression is applied to the sealing rubber 52 and the annular seal part 68 by that amount. In this state, by the second mounting member 18 of the mount main unit 12 being attached and fixed to the outer bracket 14, a fully sealed state is achieved and a high level fluid tightness is set for the fluid chamber 88.

In this way, the engine mount 10 of this embodiment is in a fully sealed state by mounting of the outer bracket 14 on the second mounting member 18, so with the mount main unit 12 for which the second mounting member 18 is press-fitted into the attaching tube part 80 of the pressing member 72, a high level of fluid tightness or large fall out resistance force are not necessary. Because of that, the outline dimensions of the second mounting member 18 and the inner dimensions of the part at which the press-fit projections 82*a*, 82*b* are formed with the attaching tube part 80 are set to have a relatively small difference (press-fit margin), and the stress that accompanies press-fitting that acts on the attaching tube part 80 is reduced.

With this embodiment, the pressing bottom part 102 of the outer bracket 14 is pressed along the entire periphery on the periphery at the bottom surface of the pressing member 72 in relation to the annular abutting part 76 of the pressing member 72. Meanwhile, the pressing upper surfaces 114 of the clasping grooves 116 are pressed partially on the periphery of the second mounting member 18 in relation to the top surface of the second mounting member 18.

By implementing crushing and swaging process on the bottom wall part of the clasping grooves 116 of the outer bracket 14, it is also possible to form a swage engaging part that engages in the insertion direction of the mount main unit 12 to the second mounting member 18, preventing falling out of the fixing parts 36, 36 of the second mounting member 18 from the clasping grooves 116, 116 of the outer bracket 14.

To the hollow hole 22 of the first mounting member 16 with the assembly for which the mount main unit 12 is attached to the outer bracket 14 in this way, the inner bracket 32 is inserted from the tip end side, whereby the engine mount 10 is constituted.

In more specific detail, in the hollow hole 22 of the first mounting member 16, the tip end side of the inner bracket 32 is inserted from the direction opposite to the insertion direction of the mount main unit 12 to the outer bracket 14. The fitting rubber layer 28 is formed by adhesion on the inner surface of the hollow hole 22, and the outer peripheral dimension of the tip end part of the inner bracket 32 is roughly equal to the dimension of the hollow hole 22, so that the inner bracket 32 is inserted in the hollow hole 22 as abutting to the fitting rubber layer 28, or compressing the fitting rubber layer 28 slightly. Thus, the inner bracket 32 and the first mounting member 16 abut to each other in a tightly adhered state via the fitting rubber layer 28, and by the friction action between the inner bracket 32 and the fitting rubber layer 28, it is possible to effectively prevent falling out of the inner bracket 32 from the first mounting member 16.

Also, as is also shown in FIG. 2, with the engine mount 10 for which the mount main unit 12, the outer bracket 14, and the inner bracket 32 are attached, the top part buffer rubber layer 31 formed on the top side of the first mounting member 16 is compressed to be pressed against the upper surface of the inner surface of the gate shaped part 94 with the outer bracket 14.

The engine mount 10 constituted as noted above is fixed to the power unit, by bolts being inserted in the insertion holes of the inner bracket 32. On the other hand, the engine mount 10 is fixed to the vehicle body by bolts being inserted in the insertion holes 98 of the outer bracket 14. By so doing, the power unit and the vehicle body are elastically coupled by the engine mount 10. In the vehicle mounted state, a shared load of the power unit weight is applied to the engine mount 10, and the main rubber elastic body 20 is elastically deformed. As a result, the first mounting member 16 and the second mounting member 18 are displaced in the direction relatively approaching in the mount center axis direction, and are at opposite facing positions with a designated separation distance. Also, for example, the engine mount 10 is mounted on the vehicle such that the up-down direction in FIG. 2 is the vehicle vertical direction, and the lateral direction in FIG. 2 is the front-back or lateral direction of the vehicle.

When vibration such as engine shake or the like is input via the inner bracket 32 to the engine mount 10, a vibration damping effect can be exhibited on the input vibration owing to the resonance action or the like by non-compressible fluid flowing through the orifice passage 66.

Here, when excessive vibration is input downward to the engine mount 10, the inner bracket 32 abuts to the top end surface of the side vertical wall 106 of the outer bracket 14 via the bottom part buffer rubber layer 46 shown in FIGS. 11 and 12. This makes it possible to exhibit bound stopper function of limiting the displacement amount of the first mounting member 16 and the second mounting member 18 in the relative approach direction in the mount center axis direction in cushioned fashion.

Meanwhile, when excessive vibration is input upward to the engine mount 10, the first mounting member 16 abuts to the upper surface of the gate shaped part 94 of the outer bracket 14 via the top part buffer rubber layer 31. This makes it possible to exhibit rebound stopper function of limiting the displacement amount of the first mounting member 16 and the second mounting member 18 in the relative separation direction in the mount center axis direction in cushioned fashion.

Furthermore, when excessive vibration is input in the vehicle front-back or lateral direction in relation to the engine mount 10, the first mounting member 16 abuts to the peripheral wall inner surface 108 on the outer bracket 14 via both side buffer rubber layers 54, 54. This makes it possible to exhibit axis-perpendicular stopper function of limiting the relative displacement amount of the first mounting member 16 and the second mounting member 18 in the front-back direction or the left-right direction of the vehicle in cushioned fashion.

With this kind of engine mount 10 constituted according to this embodiment, in the mount main unit 12, by the second mounting member 18 being press-fitted into the attaching tube part 80 of the pressing member 72, there is a fluid tight seal between the second mounting member 18 and the partition member 58 and between the partition member 58 and the flexible film 60, and fluid can be sealed in the fluid chamber 88.

Here, the plurality of press-fit projections 82*a*, 82*b* are formed on the inner peripheral face of the attaching tube part 80, and the second mounting member 18 is press-fitted into the attaching tube part 80 at the parts where the press-fit projections 82*a*, 82*b* are formed. On the other hand, at the parts away from the press-fit projections 82*a*, 82*b* in the peripheral direction, the outer peripheral face of the second mounting member 18 and the inner peripheral face of the attaching tube part 80 are mutually separated. Thus, the stress due to press-fitting of the second mounting member 18 is mainly applied to the part at which the press-fit projections 82*a*, 82*b* are formed on the periphery of the attaching tube part 80. Furthermore, the transmission prevention holes 84*a*, 84*b* that pierce through the annular plate part 78 are each formed at the same peripheral position as the respective press-fit projection 82*a*/82*b* with the annular plate part 78, and the deformation rigidity of the attaching tube part 80 and the annular plate part 78 is reduced.

Accordingly, the stress applied to the attaching tube part 80 by press-fitting of the second mounting member 18 is prevented from being transmitted to the sealing tube part 74 via the annular plate part 78, and deformation of the sealing tube part 74 due to stress during press-fitting is limited. As a result, occurrence of gaps between the inner peripheral face of the sealing tube part 74 and the outer peripheral face of the partition member 58 is prevented. Therefore, without entering between the sealing tube part 74 and the partition member 58, the sealing rubber 52 is compressed between the second mounting member 18 and the partition member 58 in the axial direction, and the target sealing performance is stably exhibited.

In particular with this embodiment, a transmission prevention hole 84*a*/84*b* is formed corresponding to each of all the press-fit projections 82*a*, 82*b*, and each press-fit projection 82*a*/82*b* and the respective transmission prevention hole 84*a*/84*b* are arranged at the same position on the periphery. Because of that, the transmission of the stress that acts on the attaching tube part 80 at the part at which each press-fit projection 82*a*/82*b* is formed is reduced by the respective transmission prevention hole 84*a*/84*b*, so that deformation of the sealing tube part 74 is more advantageously prevented. As shown in this embodiment, since the press-fit projections 82*a*, 82*b* are formed partially on the periphery, it is not necessary to provide the transmission prevention hole 84*a*/84*b* continuous on the entire periphery of the annular plate part 78. Also, it is possible to successfully ensure strength of the members of the annular plate part 78 and thus the pressing member 72.

In fact, by having the peripheral length of the transmission prevention hole 84*a*/84*b* be not less than the peripheral length of the corresponding press-fit projection 82*a*/82*b* arranged at the same position on the periphery, the transmission prevention holes 84*a*, 84*b* are formed across the peripheral entirety in relation to the main transmission part of stress due to press-fitting, so that transmission of stress to the sealing tube part 74 is effectively reduced by the transmission prevention holes 84*a*, 84*b*. In addition, with this embodiment, the peripheral length of the transmission prevention hole 84*a*/84*b* and the peripheral length of the corresponding press-fit projection 82*a*/82*b* are roughly the same, so while effectively reducing transmission of stress, it is possible to avoid the strength of the annular plate part 78 from being too small due to formation of the transmission prevention holes 84*a*, 84*b*.

Also, the press-fit projections 82*a*, 82*b* extend to a certain length respectively in the peripheral direction and the axial direction, and the projection tip end of the press-fit projection 82*a*/82*b* is a surface that broadens in the peripheral direction and the axial direction. Because of that, it is possible to ensure sufficient surface area of the press-fitting surface of the second mounting member 18 and the attaching tube part 80, in order to effectively obtain resistance force to the seal reaction force exhibited by press-fitting, said another way, resistance force to falling out.

Furthermore, with this embodiment, the press-fit projection 82*a*/82*b* extends in the axial direction to the proximal end of the attaching tube part 80, whereby the press-fitting surface area is efficiently ensured, and it is difficult for slant to occur relatively between the second mounting member 18 and the attaching tube part 80 during press-fitting. In fact, at the parts where the press-fit projections 82*a*, 82*b* are formed, the transmission prevention holes 84*a*, 84*b* are formed on the annular plate part 78, so even if the press-fit projections 82*a*, 82*b* are formed up to the proximal end of the attaching tube part 80, it is possible to avoid an increase in the efficiency of transmission of stress because the attaching tube part 80 and the annular plate part 78 are reinforced by the press-fit projections 82*a*, 82*b*. In particular, the transmission prevention holes 84*a*, 84*b* are formed at the outer peripheral end part of the annular plate part 78 including the extension line in the axial direction of the inner peripheral face (projection tip end surface of the press-fit projection 82*a*/82*b*) of the attaching tube part 80, so reinforcing action due to the pressing projections 82*a*, 82*b* is advantageously avoided, and transmission of stress from the attaching tube part 80 to the annular plate part 78 is effectively reduced.

Yet further, the inner peripheral face of the press-fit projection 82*a*/82*b* (projection tip end surface of the press-fit projection 82*a*/82*b*) and the outer peripheral face of the press-fit part 42 of the second mounting member 18 (contact surface of the projection tip end of the press-fit projection 82*a*/82*b*) that constitute the press-fitting surface both extend without slanting in the axial direction. Because of that, the surface area of the press-fitting surface is efficiently ensured to be large, and it is possible to realize press-fitting work that is smooth with very little catching or the like, while effectively obtaining the resistance force exhibited by press-fitting.

However, even if the inner peripheral face of the press-fit projection 82*a*/82*b* and the outer peripheral face of the press-fit part 42 of the second mounting member 18 slant relative to each other, it is sufficient if the target resistance force is exhibited in the press-fitting state at least at one portion. Specifically, it is also possible to use a constitution for which the press-fit projections 82*a*, 82*b* and the press-fit part 42 partially abut to each other in the axial direction, and at the other parts, a gap is formed in the radial direction between the press-fit projections 82*a*, 82*b* and the press-fit part 42. Furthermore, the inner peripheral face of the press-fit projections 82*a*, 82*b* and the outer peripheral face of the press-fit part 42 of the second mounting member 18 can have slanted surfaces for which they are parallel to each other and both slant in relation to the axial direction. For example, if the inner peripheral face of the press-fit projection 82*a*/82*b* is a slanted surface that expands facing the upper opening part of the attaching tube part 80, it is easier to insert the second mounting member 18 in the attaching tube part 80.

Also, the press-fit projections 82*a*, 82*b* are formed projecting at the inner peripheral face of the attaching tube part 80, and both the press-fit projections 82*a*, 82*b* and the transmission prevention holes 84*a*, 84*b* are formed on the pressing member 72. Because of that, the press-fit projections 82*a*, 82*b* and the transmission prevention holes 84*a*, 84*b* are positioned relative to each other in advance in the peripheral direction, whereby it is possible to arrange the transmission prevention holes 84*a*, 84*b* on the part that transmits stress that is set according to the positions at which the press-fit projections 82*a*, 82*b* are formed.

Also, since the transmission prevention part of this embodiment is the transmission prevention holes 84*a*, 84*b*, and the inner peripheral face thereof is sufficiently separated in the radial direction, compared to a slit (a cut) for which the inner peripheral face is in contact or is near in the radial direction, the transmission of stress is effectively reduced even during deformation of the annular plate part 78 and the like. In fact, compared to a slit or the like, the transmission prevention holes 84*a*, 84*b* are easily formed when molding the annular plate part 78, and post-processing or the like for forming the transmission prevention part is also unnecessary.

Furthermore, with the annular plate part 78, the deformation rigidity which is decreased due to formation of the plurality of transmission prevention holes 84*a*, 84*b* is supplemented by the reinforcing ribs 81. By so doing, it is possible to ensure a large press-fitting surface set with the projection tip end surfaces of the press-fit projections 82*a*, 82*b*, and while effectively reducing the transmission of stress from each press-fit projection 82*a*/82*b* to the sealing tube part 74 using the transmission prevention holes 84*a*, 84*b*, it is possible to prevent a marked decrease in strength of the annular plate part 78. In particular, the reinforcing ribs 81 are arranged separated from the parts at which the transmission prevention holes 84*a*, 84*b* are formed, so it is also possible to prevent an increase in the stress transmission rate using the reinforcing ribs 81.

Above, we gave detailed descriptions of the embodiments of the present invention, but the present invention is not limited by those specific descriptions. For example, the transmission prevention part is not limited to being the hole shaped items shown with the embodiments noted above, and in addition to a slit shape or the like for which the inner surfaces mutually abut in the radial direction, it is also possible to use the kind of constitution shown in FIG. 20. Specifically, on the annular plate part 78 of a pressing member 130 as the sealing member shown in FIG. 20, a lightening part 132 that has a shape of a recess or a notch and opens at the bottom surface is formed, and the part at which the lightening part 132 is formed with the annular plate part 78 is a thin walled part 134 as a transmission prevention part with low deformation rigidity. With this kind of transmission prevention part as well, the transmission of stress that accompanies press-fitting is reduced.

Figure 20:
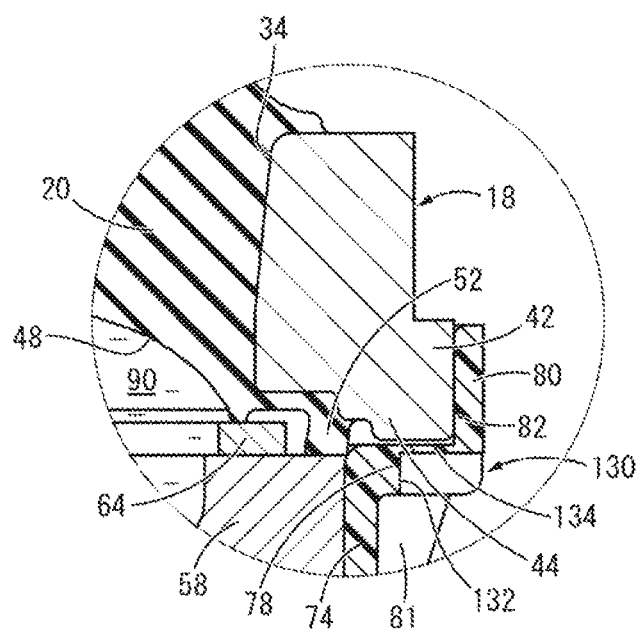
FIG. 20 is a vertical cross section view showing a principal part of an engine mount as another embodiment of the present invention.
Figure 21:
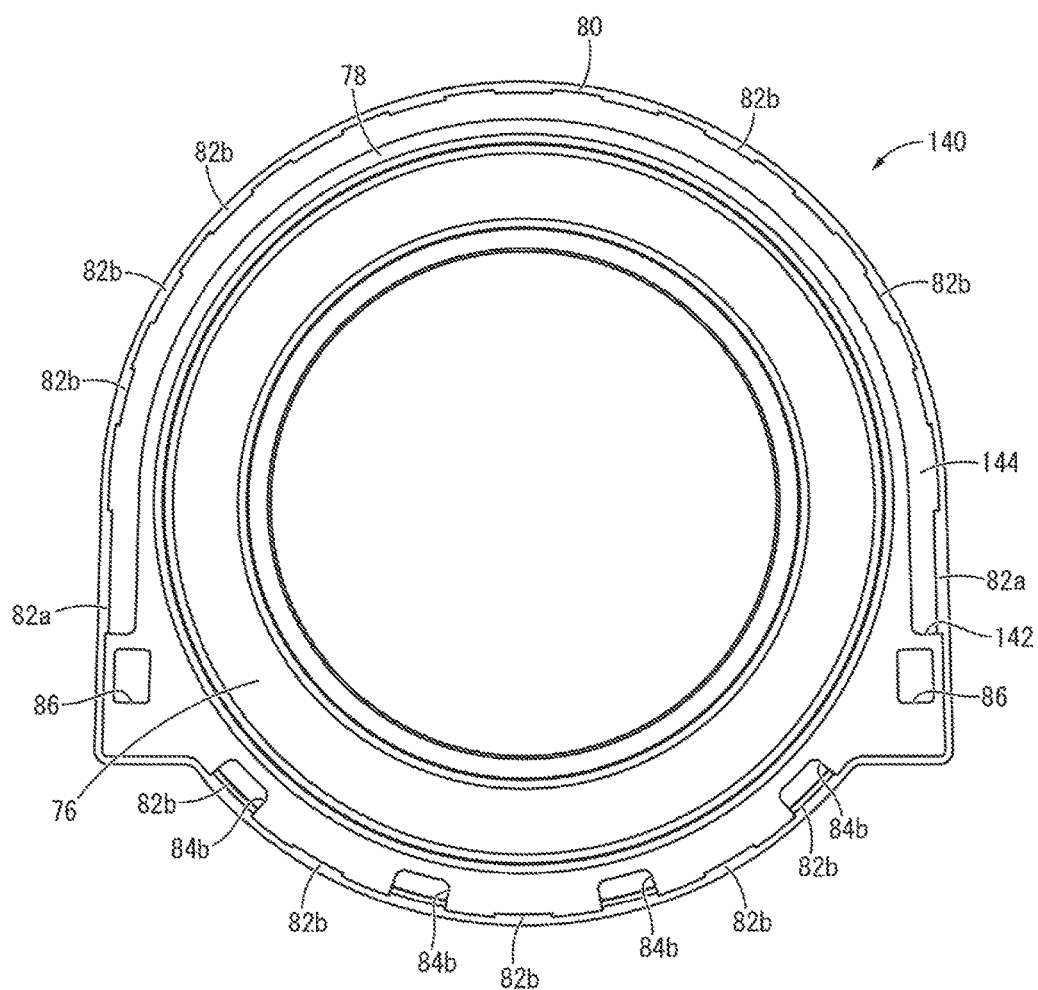
FIG. 21 is a plan view of the sealing member of the engine mount as yet another embodiment of the present invention.

Furthermore, on the annular plate part 78 of a pressing member 140 as the sealing member shown in FIG. 21, formed are the transmission prevention holes 84*a*, 84*b* that pierce through the annular plate part 78 and a recess shaped or concave-groove shaped lightening part 142 that extends in the peripheral direction opening at the top surface of the annular plate part 78. Therefore, in the pressing member 140, the transmission prevention part of the annular plate part 78 is constituted not only by the transmission prevention holes 84*a*, 84*b* but also by a thin walled part 144 that is provided at the formation part of the lightening part 142 to have the stress transmission rate decreased by its deformation rigidity being reduced by the lightening part 142. Also, the thin walled part 144 can be provided at each position corresponding to the respective press-fit projection 82*a*/82*b*, but as shown in FIG. 21, it is also possible to provide the thin walled part 144 continuously at the length of a half periphery or greater in the peripheral direction such that the plurality of press-fit projections 82*a*, 82*b* are arranged in the middle of the peripheral direction of the thin walled parts 144. Furthermore, with the pressing member 140, the transmission prevention parts are provided on not all the inner peripheral sides of the press-fit projections 82*a*, 82*b*. In fact, at the inner peripheral side of some of the press-fit projections 82*a*, 82*b*, neither the transmission prevention holes 84*a*, 84*b* nor the thin walled parts 144 are provided. As is clear from the constitution of FIG. 21, it is also possible to combine and use a plurality of types of transmission prevention parts with mutually different constitutions, and it is not necessary to provide the transmission prevention parts at all the parts for which stress is transmitted from the press-fit projections 82*a*, 82*b* to the sealing tube part 74. In FIGS. 20 and 21, in regards to substantially the same members and parts as those of the first embodiment, by giving the same code numbers in the drawing, an explanation is omitted.

Also, the press-fit projection and the transmission prevention part do not absolutely have to be formed at the same length in the peripheral direction. It is also possible to have the peripheral lengths of the press-fit projection and the transmission prevention part be mutually different, or to have one of the press-fit projection and the transmission prevention part extend further to the peripheral outside of the other. When the peripheral lengths of the press-fit projections and the transmission prevention parts are mutually different, it is preferable that the peripheral length of the transmission prevention parts be greater than the peripheral length of the press-fit projections, and that the transmission prevention parts extend further to the peripheral outside of the press-fit projections.

Also, if the transmission prevention parts are formed on the parts for which stress due to press-fitting is transmitted, it is not absolutely necessary that they be arranged in the same peripheral direction position as the press-fit projections. In particular, when the peripheral lengths of the transmission prevention parts and the press-fit projections are mutually different, it is possible to have the transmission prevention parts and the press-fit projections be arranged at mutually different positions in the peripheral direction.

Also, the transmission prevention parts do not absolutely have to be formed at the end part on the attaching tube part side with the step part. For example, the transmission prevention parts can also be formed at the radial direction center part of the step part, and can be positioned separated toward the inner periphery in relation to the attaching tube part.

With the first embodiment noted above, the tentatively sealed mount main unit 12 is constituted by press-fitting the second mounting member 18 into the attaching tube part 80, and the fully sealed engine mount 10 is constituted by mounting the outer bracket 14 on the mount main unit 12. However, for example, by suitably setting the press-fitting margin or the like, it is also possible to have the fully sealed mount main unit 12 constituted with a high level of fluid tightness set for the fluid chamber 88 by press-fitting of the second mounting member 18 into the attaching tube part 80.

Also, the specific constitution for the inner bracket and the outer bracket is not limited in any way. For example, with the outer bracket, it is possible to use a constitution that does not have the top part of the gate shaped part. When a rebound stopper function is required in the case of using the outer bracket of this constitution, it is also possible to separately use a rebound stopper of a different constitution. Yet further, for the first mounting member, it is also possible to use a constitution with a block shape or the like as appropriate.

Furthermore, the present invention can be used not only for engine mounts, but can also be used for example for a sub-frame mount, a differential mount or the like. Yet further, the fluid-filled vibration-damping device of the present invention is not limited to being for automobiles, but can also be used for motorcycles, railway vehicles, industrial vehicles or the like.

What is claimed is:
1. A fluid-filled vibration-damping device comprising:
a first mounting member;

an annular second mounting member, the first mounting member being arranged above and spaced from the second mounting member on a center axis of the second mounting member;
a main rubber elastic body to which the first mounting member and the second mounting member are directly adhered by vulcanization such that the first mounting member and the second mounting member are elastically connected to each other by the main rubber elastic body;
a fluid chamber whose wall is partially constituted by the main rubber elastic body, a non-compressible fluid being sealed in the fluid chamber;
a partition member and a flexible film arranged overlapping on a bottom side of the second mounting member such that the fluid chamber is partitioned by the partition member into (i) a pressure-receiving chamber whose wall is partially constituted by the main rubber elastic body and (ii) an equilibrium chamber whose wall is partially constituted by the flexible film;
a tubular sealing member attached so as to cover outer peripheral surfaces of the partition member and the flexible film, and having a step part and being attached to the second mounting member, the sealing member having an attaching tube part and a sealing tube part on opposite sides of the step part;
at least one press-fit projection formed partially on a periphery of at least one of an inner peripheral face of the attaching tube part and an outer peripheral face of the second mounting member, the second mounting member being secured in the attaching tube part by press-fit contact of the press-fit projection; and
a stress transmission reduction part provided in the step part of the sealing member on a portion through which stress caused by press-fitting is transmitted from the attaching tube part to the sealing tube part such that the stress transmission reduction part reduces transmission of the stress from the attaching tube part to the sealing tube part,
wherein the stress transmission reduction part is a stress transmission reduction hole penetrating through the step part.

2. The fluid-filled vibration-damping device according to claim 1, wherein the at least one press-fit projection comprises a plurality of press-fit projections formed on the periphery of the second mounting member and the attaching tube part.

3. The fluid-filled vibration-damping device according to claim 1, wherein the press-fit projection is formed on the inner peripheral face of the attaching tube part in the sealing member.

4. The fluid-filled vibration-damping device according to claim 1, wherein, with respect to the second mounting member and the attaching tube part, both a projecting tip of the press-fit projection and a contact face to which the projecting tip of the press-fit projection is abutted extend in an axial direction substantially without slanting with respect to the axial direction.

5. The fluid-filled vibration-damping device according to claim 1, wherein the at least one press-fit projection comprises a plurality of press-fit projections, each extending at a prescribed length along the inner peripheral face of the attaching tube part or the outer peripheral face of the second mounting member.

6. The fluid-filled vibration-damping device according to claim 5, wherein a projecting tip of each press-fit projection curves in a direction along the inner peripheral face of the attaching tube part or the outer peripheral face of the second mounting member.

7. The fluid-filled vibration-damping device according to claim 1, wherein the press-fit projection extends in an axial direction to a proximal end of the attaching tube part.

8. The fluid-filled vibration-damping device according to claim 1, wherein a peripheral length of the stress transmission reduction part is not less than a peripheral length of the press-fit projection, and the press-fit projection is arranged in an intermediate portion in a peripheral direction of the stress transmission reduction part.

9. The fluid-filled vibration-damping device according to claim 1, wherein the stress transmission reduction part is provided at a portion of the step part including a line contacting and parallel to the inner peripheral face of the attaching tube part, and the line passes through the stress transmission reduction part.

10. The fluid-filled vibration-damping device according to claim 1, wherein a reinforcing rib is provided at a portion of the step part away from the stress transmission reduction part so as to enhance deformation rigidity of the step part.

11. The fluid-filled vibration-damping device according to claim 1, further comprising:
a sealing rubber compressed by the second mounting member being press-fitted into the attaching tube part of the sealing member to seal the fluid chamber temporarily; and
an outer bracket installed around the second mounting member to exert a pressing force in an axial direction between the second mounting member and the sealing member so as to enhance a compression ratio of the sealing rubber to seal the fluid chamber fully.

12. The fluid-filled vibration-damping device according to claim 1, further comprising a positioner that positions the second mounting member and the attaching tube part of the sealing member in relation to each other in a peripheral direction.

13. A fluid-filled vibration-damping device comprising:
a first mounting member;
an annular second mounting member, the first mounting member being arranged above and spaced from the second mounting member on a center axis of the second mounting member;
a main rubber elastic body to which the first mounting member and the second mounting member are directly adhered by vulcanization such that the first mounting member and the second mounting member are elastically connected to each other by the main rubber elastic body;
a fluid chamber whose wall is partially constituted by the main rubber elastic body, a non-compressible fluid being sealed in the fluid chamber;
a partition member and a flexible film arranged overlapping on a bottom side of the second mounting member such that the fluid chamber is partitioned by the partition member into (i) a pressure-receiving chamber whose wall is partially constituted by the main rubber elastic body and (ii) an equilibrium chamber whose wall is partially constituted by the flexible film;
a tubular sealing member attached so as to cover outer peripheral surfaces of the partition member and the flexible film, and having a step part and being attached to the second mounting member, the sealing member having an attaching tube part and a sealing tube part on opposite sides of the step part;

at least one press-fit projection formed partially on a periphery of at least one of an inner peripheral face of the attaching tube part and an outer peripheral face of the second mounting member, the second mounting member being secured in the attaching tube part by press-fit contact of the press-fit projection; and a stress transmission reduction part provided in the step part of the sealing member on a portion through which stress caused by press-fitting, is transmitted from the attaching tube part to the sealing tube part such that the stress transmission reduction part reduces transmission of the stress from the attaching tube part to the sealing tube part, wherein the partition member is supported by the second mounting member, the partition member being arranged on an inner peripheral side of the sealing tube part of the sealing member so that an outer peripheral face of the partition member is superposed to an inner peripheral face of the sealing tube part; and the fluid-filled vibration-damping device further comprises a sealing rubber arranged between the second mounting member and the partition member, the sealing rubber being compressed between the second mounting member and the partition member by the second mounting member being press-fitted into the attaching tube part to seal the fluid chamber in a fluid-tight manner.

\* \* \* \* \*